(12) United States Patent
Teraoka et al.

(10) Patent No.: US 10,864,590 B2
(45) Date of Patent: Dec. 15, 2020

(54) SOLDERING APPARATUS

(71) Applicant: Hakko Corporation, Osaka (JP)

(72) Inventors: Yoshitomo Teraoka, Osaka (JP); Satoshi Manda, Osaka (JP); Tomoo Takahara, Osaka (JP)

(73) Assignee: HAKKO CORPORATION, Osaka (JP)

( * ) Notice: Subject to any disclaimer, the term of this patent is extended or adjusted under 35 U.S.C. 154(b) by 97 days.

(21) Appl. No.: 16/144,740

(22) Filed: Sep. 27, 2018

(65) Prior Publication Data

US 2019/0099818 A1    Apr. 4, 2019

Related U.S. Application Data

(60) Provisional application No. 62/566,653, filed on Oct. 2, 2017.

(30) Foreign Application Priority Data

Nov. 30, 2017  (JP) ................................. 2017-230709

(51) Int. Cl.
*B23K 3/00*    (2006.01)
*B23K 3/03*    (2006.01)
(Continued)

(52) U.S. Cl.
CPC ................ *B23K 3/033* (2013.01); *B23K 3/08* (2013.01); *G09B 19/24* (2013.01)

(58) Field of Classification Search
CPC ........ B23K 3/08; B23K 1/0016; B23K 3/033; B23K 2101/42; B23K 3/02; B23K 3/027;
(Continued)

(56) References Cited

U.S. PATENT DOCUMENTS 6,087,631 A  *  7/2000  Miyazaki ............... B23K 3/033
                                                  219/229
6,329,641 B1 *  12/2001  Miyazaki ............... B23K 3/033
                                                  219/497

(Continued)

FOREIGN PATENT DOCUMENTS

| JP | 61-275908 A   | 12/1986 |
| JP | 10-83213 A    | 3/1998  |
| JP | 2015-112619 A | 6/2015  |

*Primary Examiner* — Erin B Saad
(74) *Attorney, Agent, or Firm* — Squire Patton Boggs (US) LLP

(57) ABSTRACT

The present application discloses a soldering apparatus including a driving portion for moving a soldering iron to perform soldering on a surface of an electronic board including soldering regions. The soldering regions have a base region and at least one replication region existing at a position different from the base region. The replication region has an arrangement pattern that is the same as an arrangement pattern of a soldering position in the base region. The soldering apparatus includes an input portion for receiving input of positional relationship data, which represents a positional relationship between the base region and the at least one replication region, and for receiving base pattern data, which represents the arrangement pattern of the soldering position in the base region. The soldering apparatus includes a controller which causes the driving portion to move the soldering iron based on the base pattern data and the positional relationship data in a soldering operation.

8 Claims, 10 Drawing Sheets

(51) Int. Cl.
*G09B 19/24* (2006.01)
*B23K 3/08* (2006.01)

(58) Field of Classification Search
CPC ........ B23K 3/087; B23K 3/025; B23K 3/063;
B23K 37/0408; B23K 3/03; B23K
3/0323; B23K 3/0369; B23K 3/0607;
B23K 1/018; B23K 1/20; B23K 2103/12;
B23K 35/3006; B23K 3/0338; B23K
3/0346; B23K 3/0471; B23K 11/252;
B23K 1/012; B23K 23/00; B23K
37/0205; B23K 37/0235; B23K 37/0443;
B23K 3/029; B23K 3/0478; B23K
3/0646; B23K 1/16; B23K 1/19; B23K
2101/36; B23K 3/0315; B23K 3/04;
B23K 3/0615
See application file for complete search history.

(56) References Cited

U.S. PATENT DOCUMENTS

| | | | | |
|---|---|---|---|---|
| 2010/0258554 | A1* | 10/2010 | Miyazaki | B23K 3/033 |
| | | | | 219/616 |
| 2019/0104659 | A1* | 4/2019 | Teraoka | H05K 13/0895 |
| 2019/0160574 | A1* | 5/2019 | Teraoka | B23K 3/0607 |

* cited by examiner

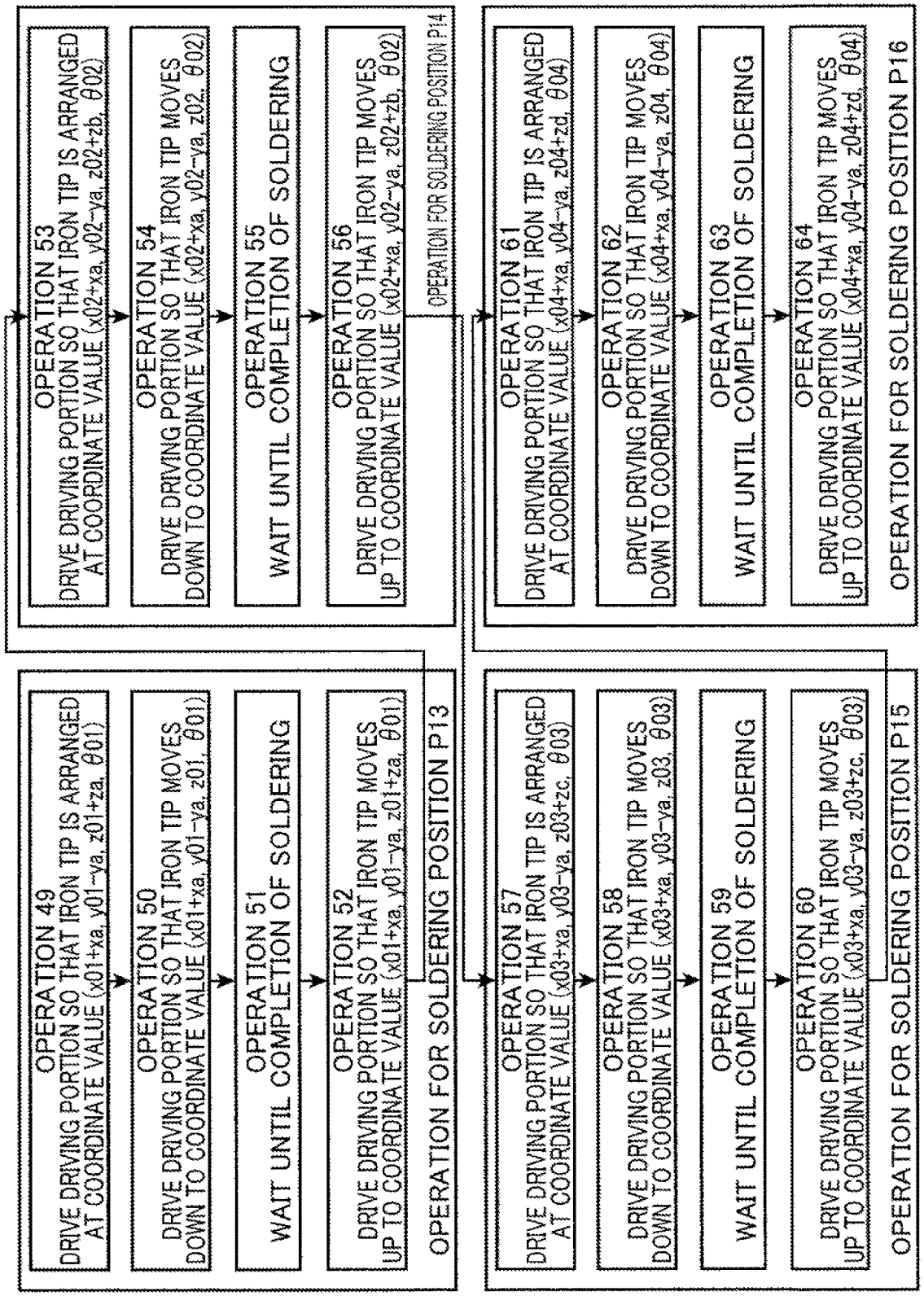

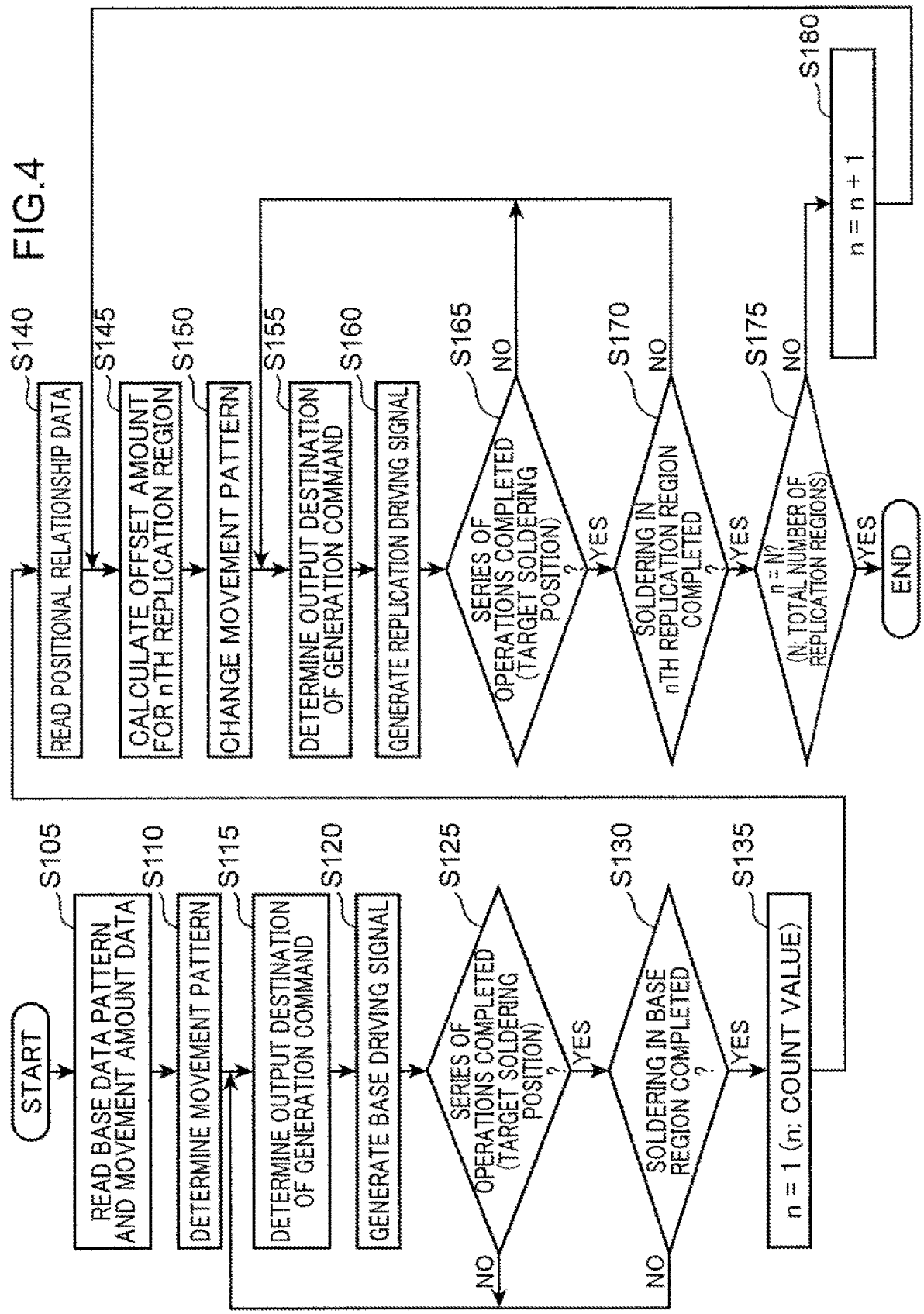

FIG.5

| | 0TH COLUMN<br>COEFFICIENT Cx = 0 | FIRST COLUMN<br>COEFFICIENT Cx = 1 | SECOND COLUMN<br>COEFFICIENT Cx = 2 | ... | (Nx − 3)TH COLUMN<br>COEFFICIENT Cx = Nx − 3 | (Nx − 2)TH COLUMN<br>COEFFICIENT Cx = Nx − 2 | (Nx − 1)TH COLUMN<br>COEFFICIENT Cx = Nx − 1 |
|---|---|---|---|---|---|---|---|
| (Ny − 1)TH ROW<br>COEFFICIENT Cy = Ny − 1 | SOLDERING ORDER: Ny − 1 / REPLICATION REGION | SOLDERING ORDER: 2Ny − 1 / REPLICATION REGION | SOLDERING ORDER: 3Ny − 1 / REPLICATION REGION | ... | SOLDERING ORDER: (Nx − 2) × Ny − 1 / REPLICATION REGION | SOLDERING ORDER: (Nx − 1) × Ny − 1 / REPLICATION REGION | SOLDERING ORDER: Nx × Ny − 1 / REPLICATION REGION |
| (Ny − 2)TH ROW<br>COEFFICIENT Cy = Ny − 2 | SOLDERING ORDER: Ny − 2 / REPLICATION REGION | SOLDERING ORDER: 2Ny − 2 / REPLICATION REGION | SOLDERING ORDER: 3Ny − 2 / REPLICATION REGION | ... | SOLDERING ORDER: (Nx − 2) × Ny − 2 / REPLICATION REGION | SOLDERING ORDER: (Nx − 1) × Ny − 2 / REPLICATION REGION | SOLDERING ORDER: Nx × Ny − 2 / REPLICATION REGION |
| (Ny − 3)TH ROW<br>COEFFICIENT Cy = Ny − 3 | SOLDERING ORDER: Ny − 3 / REPLICATION REGION | SOLDERING ORDER: 2Ny − 3 / REPLICATION REGION | SOLDERING ORDER: 3Ny − 3 / REPLICATION REGION | ... | SOLDERING ORDER: (Nx − 2) × Ny − 3 / REPLICATION REGION | SOLDERING ORDER: (Nx − 1) × Ny − 3 / REPLICATION REGION | SOLDERING ORDER: Nx × Ny − 3 / REPLICATION REGION |
| ... | ... | ... | ... | ... | ... | ... | ... |
| SECOND ROW<br>COEFFICIENT Cy = 2 | SOLDERING ORDER: 2 / REPLICATION REGION | SOLDERING ORDER: Ny + 2 / REPLICATION REGION | SOLDERING ORDER: 2Ny + 2 / REPLICATION REGION | ... | SOLDERING ORDER: (Nx − 3) × Ny + 2 / REPLICATION REGION | SOLDERING ORDER: (Nx − 2) × Ny + 2 / REPLICATION REGION | SOLDERING ORDER: (Nx − 1) × Ny + 2 / REPLICATION REGION |
| FIRST ROW<br>COEFFICIENT Cy = 1 | SOLDERING ORDER: 1 / REPLICATION REGION | SOLDERING ORDER: Ny + 1 / REPLICATION REGION | SOLDERING ORDER: 2Ny + 1 / REPLICATION REGION | ... | SOLDERING ORDER: (Nx − 3) × Ny + 1 / REPLICATION REGION | SOLDERING ORDER: (Nx − 2) × Ny + 1 / REPLICATION REGION | SOLDERING ORDER: (Nx − 1) × Ny + 1 / REPLICATION REGION |
| 0TH ROW<br>COEFFICIENT Cy = 0 | SOLDERING ORDER: 0 / BASE REGION | SOLDERING ORDER: Ny / REPLICATION REGION | SOLDERING ORDER: 2Ny / REPLICATION REGION | ... | SOLDERING ORDER: (Nx − 3) × Ny / REPLICATION REGION | SOLDERING ORDER: (Nx − 2) × Ny / REPLICATION REGION | SOLDERING ORDER: (Nx − 1) × Ny / REPLICATION REGION |

900

REAR / RIGHT / FRONT / LEFT

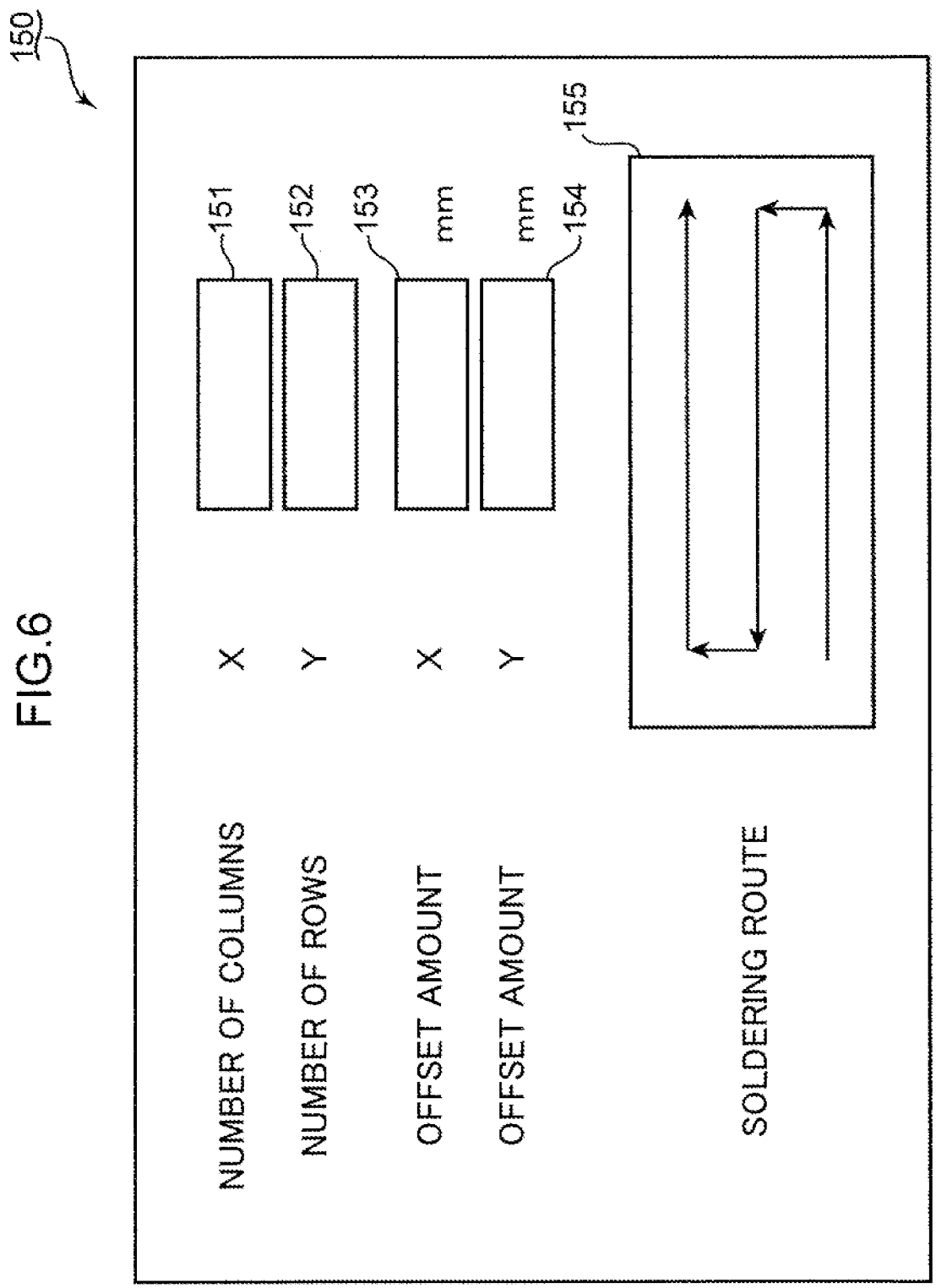

SOLDERING APPARATUS

CROSS-REFERENCE TO RELATED APPLICATIONS

This application claims the benefit of Provisional Application No. 62/566,653, filed Oct. 2, 2017, which is hereby incorporated by reference. This application claims the benefit of Japanese Application No. 2017-230709, filed Nov. 30, 2017, which is hereby incorporated by reference.

TECHNICAL FIELD

The present invention relates to a soldering apparatus for automatically soldering at predetermined soldering positions.

BACKGROUND ART

Various soldering apparatuses for automatically soldering at predetermined soldering positions have been developed (c.f. JP 2000-75912 A). According to JP 2000-75912 A, an operator may input a coordinate value of a soldering position to a personal computer to set the soldering position (a so-called teaching operation). The soldering apparatus may perform soldering at the input soldering position.

A large soldered electronic board may be cut into small electronic boards. These small electronic boards are incorporated into electric devices. In this case, an arrangement pattern of soldering positions is common (the same) among the small electronic boards. Many soldering positions exist on the large electronic board, the soldering positions corresponding to a product (A×B) of the number of soldering positions (A) set on the electronic board incorporated in the electric device and the number of divisions (B) of the large electronic board.

Under the aforementioned technique for setting the soldering position, the operator has to make the soldering apparatus store all the soldering positions individually on the large electronic board. Therefore, the aforementioned technique for setting the soldering position has a great deal of labor of the operator performing the teaching operation to store the soldering positions in the soldering apparatus.

SUMMARY

It is an object of the present invention to provide a soldering apparatus which enables an operator to easily set soldering positions.

In aspects of the invention, a soldering apparatus comprises a soldering iron, a driving portion, an input portion, and a controller. The soldering iron is configured to perform soldering on a surface of an electronic board having soldering regions, the soldering regions including a base region and at least one replication region. The base region has at least one soldering position in an arrangement pattern. Each replication region includes an arrangement pattern that is the same as the arrangement pattern of the at least one soldering position in the base region. The driving portion is configured to move the soldering iron. The input portion is configured to receive, for each replication region, input of positional relationship data representing a positional relationship between the base region and the replication region, and is configured to receive base pattern data representing the arrangement pattern of the at least one soldering position in the base region. The controller is configured to control the driving portion based on the base pattern data and the positional relationship data. The controller determines a base region movement pattern based on the base pattern data. The controller controls the driving portion such that the soldering iron moves, according to the determined base region movement pattern, to the at least one soldering position of the base region. The controller controls the driving portion such that the soldering iron is moved in each replication region based on the respective positional relationship data and the determined base region movement pattern.

The aforementioned soldering apparatus enables an operator to easily set a soldering position.

The objects, features, and advantages of the soldering apparatus described above will become more apparent from the following detailed description and the accompanying drawings.

BRIEF DESCRIPTION OF DRAWINGS

FIG. 3C is a flowchart showing a third replication region movement pattern which the pattern analyzer of the soldering apparatus shown in FIG. 1 has determined by translating the base region movement pattern with an offset amount;

FIG. 4 is a schematic flowchart showing an exemplary operation of a controller of the soldering apparatus shown in FIG. 1;

FIG. 5 is a schematic plan view of an exemplary electronic board having a base region and multiple replication regions;

FIG. 6 is an exemplary image displayed by an input interface of the soldering apparatus shown in FIG. 1;

DESCRIPTION OF EMBODIMENT

<Soldering Apparatus Developed by the Present Inventors>

Figure 7:
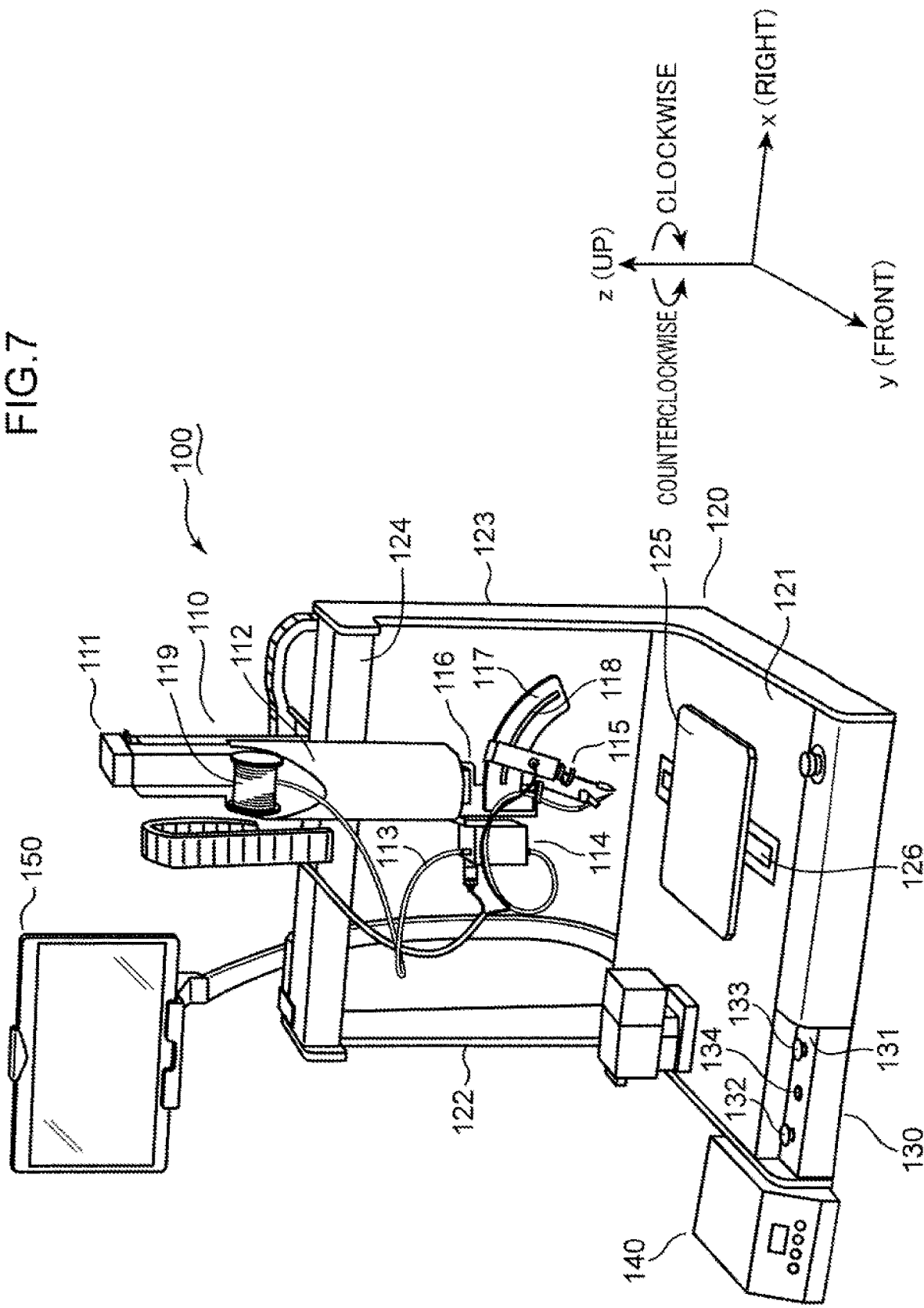
FIG. 7 is a schematic perspective view of the soldering apparatus shown in FIG. 1.

FIG. 7 is a schematic perspective view of a soldering apparatus 100 developed by the present inventors. A schematic structure of the soldering apparatus 100 is described with reference to FIG. 7.

FIG. 7 shows orthogonal coordinates defined by x, y, z-axes. In the following description, a positive direction of the x-axis is defined as "right". A negative direction of the x-axis is defined as "left". A positive direction of the y-axis is defined as "front". A negative direction of the y-axis is defined as "rear". A positive direction of the z-axis is defined as "up". A negative direction of the z-axis is defined as "down". Terms "clockwise" and "counterclockwise" refer to a rotation about a rotation axis in parallel to the z-axis. These directional terms are used for clarity of explanation only. Therefore, a principle of the present embodiment is not limited by these directional terms.

The soldering apparatus 100 includes a soldering mechanism 110, a support 120, an operation unit 130, a heating controller 140, an input interface 150 and a driving portion (not shown). The soldering mechanism 110 performs soldering to an electronic board (not shown). The heating controller 140 is used for temperature control of the soldering mechanism 110. The support 120 supports the soldering mechanism 110, the operation unit 130 and the driving portion. Motors used as the driving portion are attached to the support 120 and the soldering mechanism 110. The operation unit 130 may be suitably used for a teaching operation to store a coordinate value of a soldering position on the electronic board in the soldering apparatus 100. When an operator performing the teaching operation operates the operation unit 130, the driving portion moves or rotates the soldering mechanism 110 in a direction determined by the operation on the operation unit 130. The input interface 150 is used for inputting various operation parameters of the soldering apparatus 100.

The support 120 includes a base 121, two columns 122, 123, a support bridge 124 and an installation table 125. The base 121 is a portion formed like a substantially rectangular plate. The column 122 stands upward from a left edge of the base 121. The column 123 stands upward from a right edge of the base 121. The columns 122, 123 are aligned in the x-axis direction. The support bridge 124 is bridged from the left column 122 to the right column 123. Therefore, the support bridge 124 extends in the x-axis direction. The soldering mechanism 110 is attached to the support bridge 124. When the operator operates the operation unit 130, one of the motors used as the driving portion may move the soldering mechanism 110 along the support bridge 124.

The installation table 125 is a portion formed like a substantially rectangular plate, the installation table being installed on an upper surface of the base 121. The operator may fix the electronic board on the installation table 125. The operator may operate the operation unit 130 to move the soldering mechanism 110 above the installation table 125 in the x-axis direction and the z-axis direction, or to rotate the soldering mechanism 110 around a rotation axis in parallel to the z-axis. As shown in FIG. 7, a slot 126 extending in a y-axis direction is formed on the upper surface of the base 121. When the operator operates the operation unit 130, one of the motors used as the driving portion may move the installation table 125 along the slot 126. A relative positional relationship between the electronic board on the installation table 125 and the soldering mechanism 110 is adjusted by the movement of the soldering mechanism 110 in the x-axis direction and the z-axis direction. The relative positional relationship between the electronic board on the installation table 125 and the soldering mechanism 110 is adjusted by the movement of the installation table 125 in the y-axis direction.

The soldering mechanism 110 includes a horizontally movable column 111, a vertically movable column 112, a thread solder 113, a solder feeder 114, a soldering iron 115 and a holding portion 116. The horizontally movable column 111 holds the vertically movable column 112, the thread solder 113, the solder feeder 114, the soldering iron 115 and the holding portion 116, and moves in the x-axis direction under an operation of the driving portion. The vertically movable column 112 holds the thread solder 113, the solder feeder 114, the soldering iron 115 and the holding portion 116, and moves in the z-axis direction under the operation of the driving portion. The holding portion 116 holds the solder feeder 114 and the soldering iron 115, and make these go around a rotation axis substantially coincident with a vertical central axis of the vertically movable column 112. The solder feeder 114 feeds the thread solder 113 to an iron tip forming a distal end of the soldering iron 115. The iron tip may be made of any material suitable for soldering. Under the temperature control of the heating controller 140, the soldering iron 115 melts the thread solder 113 fed from the solder feeder 114.

The horizontally movable column 111 is a columnar member elongated in the z-axis direction. The horizontally movable column 111, the support bridge 124 and the driving portion are designed so that the horizontally movable column 111 moves substantially horizontally along the support bridge 124 when one of the motors forming the driving portion is operated. Various structures known in the art may be applied to the design of the horizontally movable column 111, the support bridge 124 and the driving portion. The present embodiment is not limited to a specific coupling structure among the horizontally movable column 111, the support bridge 124 and the driving portion.

Like the horizontally movable column 111, the vertically movable column 112 is a columnar member elongated in the z-axis direction. The vertically movable column 112, the horizontally movable column 111 and the driving portion are designed so that the vertically movable column 112 moves substantially vertically along the horizontally movable column 111 when one of the motors forming the driving portion is operated. Various structures known in the art may be applied to the design of the vertically movable column 112, the horizontally movable column 111 and the driving portion. The present embodiment is not limited to a specific coupling structure among the vertically movable column 112, the horizontally movable column 111 and the driving portion.

The holding portion 116 is used for holding the solder feeder 114 and the soldering iron 115. The holding portion 116 is connected to a lower end of the vertically movable column 112. Therefore, the holding portion 116, the solder feeder 114 and the soldering iron 115 may move upward, downward, leftward and rightward together with the vertically movable column 112. The holding portion 116, the vertically movable column 112 and the driving portion are designed so that the holding portion 116 rotates around the rotation axis substantially coincident with the vertical central axis of the vertically movable column 112 when one of the motors forming the driving portion is operated. By operating the operation unit 130 to rotate the holding portion 116, the operator may prevent the soldering iron 115 from colliding with an electronic component on the electronic board. Since both the solder feeder 114 and the soldering iron 115 are attached to the holding portion 116, their relative positional relationship does not change during the rotation of the holding portion 116. Various structures known in the art may be applied to the design of the holding portion 116, the vertically movable column 112 and the driving portion. The present embodiment is not limited to a specific coupling structure among the holding portion 116, the vertically movable column 112 and the driving portion.

The holding portion 116 includes an arcuate plate 117 to which the soldering iron 115 is attached. An arcuate slot 118 is formed in the arcuate plate 117. The operator may change an attachment position of the soldering iron 115 along the slot 118 to adjust a tilt angle of the soldering iron 115 with respect to an upper surface of the electronic board on the installation table 125. Scale marks (not shown) may be applied along the slot 118. In this case, the operator may visually determine the numerical tilt angle of the soldering iron 115 from the scale marks.

The heating controller 140 is used to control a temperature of the iron tip of the soldering iron 115. Various feedback control techniques known in the art of soldering may be applied to the temperature control executed between the heating controller 140 and the soldering iron 115. The present embodiment is not limited to a specific temperature control technique performed between the heating controller 140 and the soldering iron 115.

A solder bobbin 119 is attached to an upper end of the vertically movable column 112, the thread solder 113 being wound around the solder bobbin 119. The thread solder 113 extends from the solder bobbin 119 to the solder feeder 114. When soldering is performed, the solder feeder 114 feeds solder to the iron tip (or area near the iron tip) of the soldering iron 115 by an amount set by the operator. Accordingly, the solder is melted at the iron tip (or area near the iron tip) of the soldering iron 115. Various solder feeding mechanisms known in the art may be used for the solder feeder 114. The present embodiment is not limited to a specific structure of the solder feeder 114.

The operation unit 130 includes a housing 131, a left lever 132, a right lever 133 and a coordinate input portion 134. The operator may tilt the left and right levers 132, 133 which project from an upper surface of the housing 131 in order to move the soldering iron 115 and the installation table 125. The coordinate input portion 134 is used for storing coordinates of the iron tip of the soldering iron 115 in the soldering apparatus 100. When the iron tip of the soldering iron 115 reaches a predetermined soldering position on the electronic board fixed on the installation table 125, the operator may operate the coordinate input portion 134 to store as the soldering position in the soldering apparatus 100 a coordinate value of a position of the iron tip in a coordinate space, which is set for arithmetic processes to be executed by the soldering apparatus 100. Various electronic components are situated in the housing 131, the various electronic components being configured to generate electric signals, which indicate tilt amounts of the left and right levers 132, 133, or which indicate that there is an operation on the storage request portion 134.

The operator may incline the left and right levers 132, 133 which project from the upper surface of the housing 131 to designate a change direction of relative positions between the electronic board on the installation table 125 and the iron tip of the soldering iron 115. The left lever 132 is used to move the iron tip of the soldering iron 115 in the z-axis direction (i.e. upward and downward movement of the iron tip) and to rotate the holding portion 116 (i.e. circular movement of the iron tip of the soldering iron 115 around the rotation axis of the holding portion 116). The right lever 133 is used to move the iron tip of the soldering iron 115 in the x-axis direction (i.e. leftward and rightward movement of the iron tip) and to move the installation table 125 in the y-axis direction (i.e. relative forward and rearward movement of the iron tip with respect to the electronic board on the installation table 125). The following table shows an exemplary correspondence relationship of the operation of the soldering apparatus 100 to the operation of the left and right levers 132, 133.

TABLE 1

| Operation content | Left lever | Right lever |
| --- | --- | --- |
| Tilt forward | Move down iron tip | Move installation table forward |
| Tilt rearward | Move up iron tip | Move installation table rearward |
| Tilt rightward | Rotate iron tip clockwise | Move iron tip rightward |
| Tilt leftward | Rotate iron tip counterclockwise | Move iron tip leftward |

When the iron tip reaches the soldering position defined on the electronic board on the installation table 125 during the teaching operation, the operator may operate the coordinate input portion 134 situated between the left and right levers 132, 133 aligned in the x-axis direction to input a coordinate position of the iron tip in the coordinate space which is set for the arithmetic processes to be executed by the soldering apparatus 100. Accordingly, the soldering apparatus 100 may store the input coordinate position as the soldering position. During the subsequent soldering operation, the soldering apparatus 100 may refer to the stored coordinate position of the soldering position to perform soldering automatically. With regard to the present embodiment, the coordinate input portion 134 is designed as a general pressing button. Therefore, the operator may perceive reaction force received from the pressing button with a fingertip to judge whether or not the pressing button has been operated.

The input interface 150 is used to input other operation parameters associated with operations of the soldering apparatus 100 (e.g. a supply amount of the aforementioned thread solder 113). A touch panel may be used as the input interface 150. In this case, the input interface 150 may display coordinate values (i.e. soldering positions) input during the aforementioned teaching operation. Therefore, the operator may see the numerical results of the teaching operation. The input interface 150 may be pushbutton keyboard or other means of entering data.

Different soldering regions on a single electronic board may have in common (the same) arrangement patterns of soldering positions. As a result of a common arrangement pattern (hereinafter referred to as "common pattern") about the soldering position being formed at different positions on one electronic board, the electronic board may have many soldering positions. The present inventors have worked for reducing the required amount of effort and time expended by the user in completing a teaching operation on the electronic board having common patterns.

Figure 8:
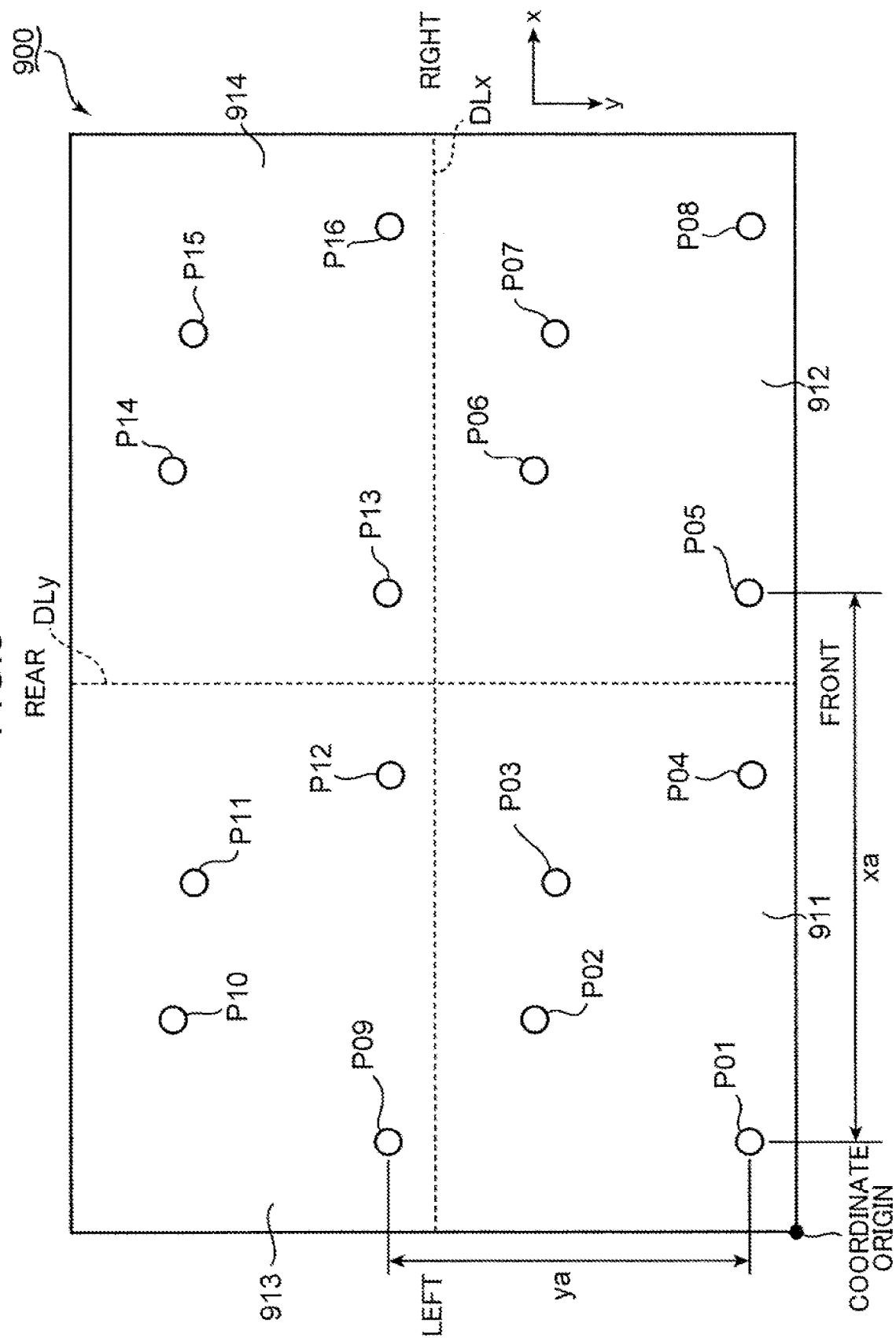
FIG. 8 is a schematic plan view of the exemplary electronic board having a base region and three replication regions.

FIG. 8 is a schematic plan view of an exemplary electronic board 900. A great burden of a teaching operation on the electronic board 900 having common patterns is described below with reference to FIGS. 7 and 8.

A dotted line DLx shown in FIG. 8 is an imaginary line extending in parallel to the x-axis. A dotted line DLy shown in FIG. 8 is an imaginary line extending in parallel to the y-axis. The electronic board 900 is equally divided into four regions by the dotted lines DLx, DLy. After the soldering operation, the electronic board 900 is cut along the dotted lines DLx, DLy, so that four small boards are formed.

There are 16 soldering positions P01 to P16 on the electronic board 900. A set of four soldering positions P01 to P04, a set of four soldering positions P05 to P08, a set of four soldering positions P09 to P12, and a set of four soldering positions P13 to P16 correspond to the four regions, respectively. The set of four soldering positions P01 to P04, the set of four soldering positions P05 to P08, the set of four soldering positions P09 to P12, and the set of four soldering positions P13 to P16 have a common arrangement pattern (i.e. these sets have a common pattern). Therefore, each of the four regions virtually divided by the dotted lines DLx, DLy is a soldering region in which the soldering operation is performed with the soldering iron 115.

The present inventors have incorporated a palletizing function in the soldering apparatus 100, the palletizing function requiring a teaching operation for one of the four regions but allowing elimination of the teaching operation for the remaining three regions. Due to the palletizing function, a movement pattern of the soldering iron 115 obtained as a result of the teaching operation which is performed on the one region, may be applied to the other regions, so that the same soldering as that in the region at which the teaching operation is performed may be performed on the other regions. As a result of the palletizing function, the teaching operation for the electronic board 900 is performed only for one of the four regions. Soldering at the soldering positions on the other regions is executed without the teaching operation for these regions on the basis of the result of the teaching operation performed on the one of the four regions. On the other hand, without the palletizing function, the operator has to perform the teaching operation for all of the 16 soldering positions on the electronic board 900. Therefore, the palletizing function may contribute to great efficiency improvement of the teaching operation.

<Soldering Apparatus Having Palletizing Function>

Figure 1:
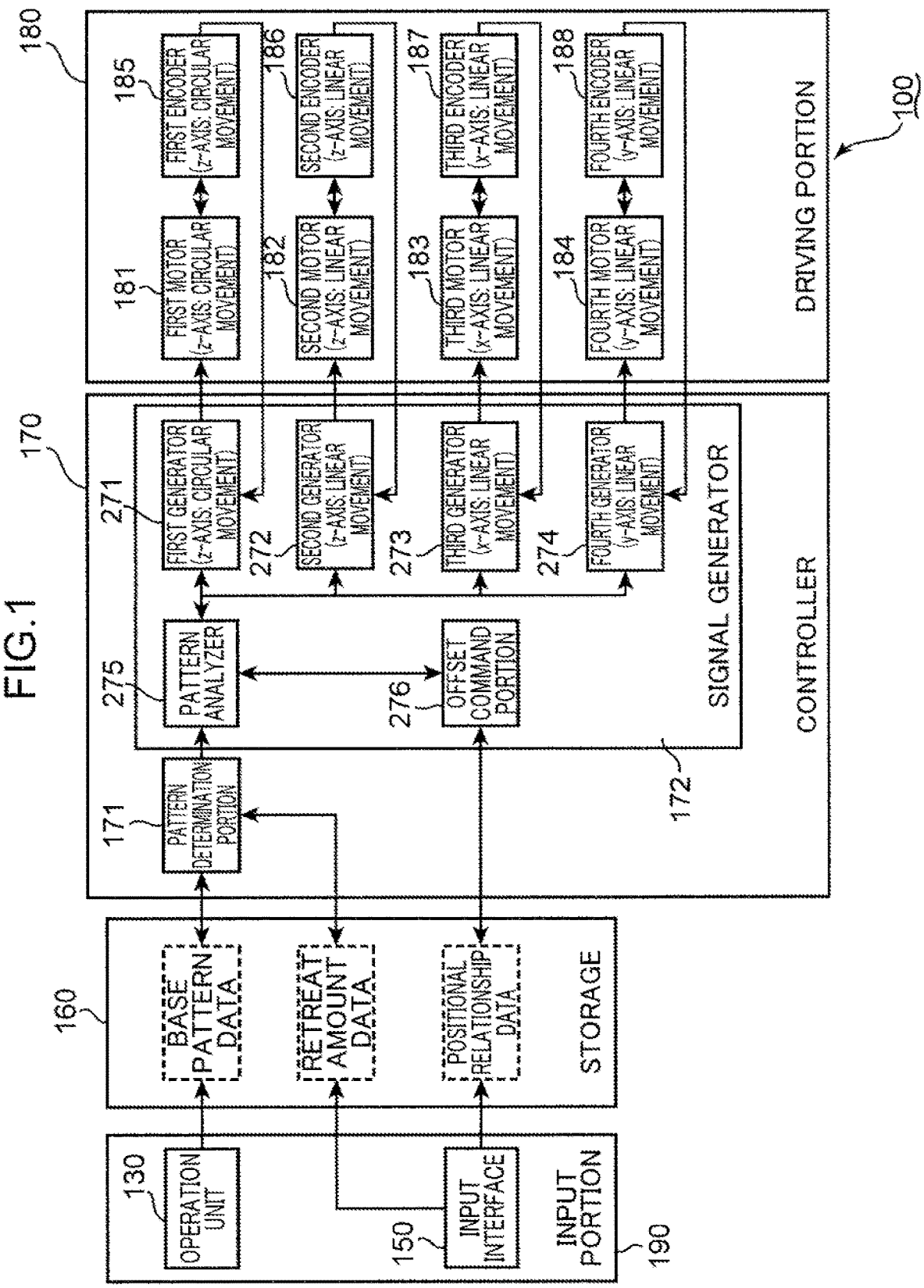
FIG. 1 is a schematic block diagram of an exemplary soldering apparatus.

FIG. 1 is a schematic block diagram of the soldering apparatus 100. The soldering apparatus 100 is described below with reference to FIGS. 1, 7 and 8.

FIG. 1 shows the operation unit 130 and the input interface 150 described with reference to FIG. 7 as an input portion 190. The input portion 190 is used for inputting data which is required for the palletizing function.

The soldering apparatus 100 includes storage 160 and a controller 170. These are incorporated in the soldering apparatus 100 for the palletizing function. The storage 160 stores input data from the input portion 190. The storage can be any or a combination of random-access memory (RAM) modules and read-only memory (ROM) modules. The controller 170 refers to the data stored in the input portion 190 to control the driving portion 180. The controller 170 may comprise one or more computer processors 30 that execute instructions, such as from a software program, that enable the processes described herein. The instructions may be stored in the storage 160 or other memory device accessible by the controller 170. Examples for the storage 160 and other memory device include without limitation a solid-state memory, optical storage (e.g., CD and DVD), and magnetic storage (e.g., HDD).

The operator may set one of the four regions described with reference to FIG. 8 as a base region 911 in which the teaching operation is performed for storing the soldering positions P01 to P04 in the soldering apparatus 100. With regard to the present embodiment, the operator sets the left front region as the base region 911. Selection of the base region 911 depends exclusively on the operator. Therefore, the principle of the present embodiment is not limited at all by which region is set as the base region 911.

The remaining regions of the four regions described with reference to FIG. 8 are set as three replication regions 912, 913, 914. The teaching operation need not be performed on these replication regions 912, 913, 914. Soldering at the soldering positions P05 to P16 of these replication regions 912, 913, 914 is performed as a result of the palletizing function instead of a teaching operation performed individually for each of the replication regions. The replication region 912 is situated to the right of the base region 911. The replication region 913 is situated to the rear of the base region 911. The replication region 914 is aligned on a diagonal line of the rectangular electronic board 900 from the base region 911. These replication regions 912, 913, 914 are handled as copies of the base region 911 in the palletizing function of the controller 170. In other words, a movement locus of the soldering iron 115 set for the base region 911 is copied to the replication regions 912, 913, 914 by the palletizing function, so that the soldering iron 115 moves along the copied movement locus to perform soldering in the replication regions 912, 913, 914 during the soldering operation.

The operator performing the teaching operation operates the operation unit 130 to input a coordinate value of the soldering position in the base region 911. With regard to the present embodiment, a left front corner of the electronic board 900 is set as a coordinate origin. The coordinate value is set with reference to the coordinate origin. The following table shows coordinate values of the soldering positions P01 to P04 in the base region 911. The input coordinate values are stored in the storage 160 as base pattern data which represents an arrangement pattern of the soldering positions P01 to P04 in the base region 911. With regard to the present embodiment, the first soldering position is one of the soldering positions P01 to P04. The second soldering position is another of the soldering positions P01 to P04.

TABLE 2

| Soldering position | Coordinate value |
| --- | --- |
| P01 | (x01, y01, z01, θ01) |
| P02 | (x02, y02, z02, θ02) |
| P03 | (x03, y03, z03, θ03) |
| P04 | (x04, y04, z04, θ04) | x01 to x04 are positions on the x-axis
y01 to y04 are positions on the y-axis
z01 to z04 are positions on the z-axis
θ01 to θ04 are angular positions around a rotation axis of the holding portion As shown in FIG. 8, there are the soldering positions P05 to P08 in the replication region 912 that differ by "xa" in the positive direction on the x-axis from the soldering positions P01 to P04 of the base region 911. There are the soldering positions P09 to P12 in the replication region 913 that differ by "ya" in the negative direction on the y-axis from the soldering positions P01 to P04 of the base region 911. There are the soldering positions P13 to P16 in the replication region 914 that differ by "xa" in the positive direction on the x-axis and by "ya" in the negative direction on the y-axis from the soldering positions P01 to P04 of the base region 911. Accordingly, the soldering positions P05 to P16 on the replication regions 912, 913, 914 may have coordinate values shown in the following table.

TABLE 3

| Soldering position | Coordinate value |
| --- | --- |
| P05 | (x01 + xa, y01, z01, θ01) |
| P06 | (x02 + xa, y02, z02, θ02) |
| P07 | (x03 + xa, y03, z03, θ03) |
| P08 | (x04 + xa, y04, z04, θ04) |
| P09 | (x01, y01 − ya, z01, θ01) |
| P10 | (x02, y02 − ya, z02, θ02) |
| P11 | (x03, y03 − ya, z03, θ03) |
| P12 | (x04, y04 − ya, z04, θ04) |

TABLE 3-continued

| Soldering position | Coordinate value |
| --- | --- |
| P13 | (x01 + xa, y01 − ya, z01, θ01) |
| P14 | (x02 + xa, y02 − ya, z02, θ02) |
| P15 | (x03 + xa, y03 − ya, z03, θ03) |
| P16 | (x04 + xa, y04 − ya, z04, θ04) |

As shown in "Table 3", the soldering positions in the replication regions 912, 913, 914 may be expressed with the coordinate values of the soldering positions of the base region 911. A positional relationship between the base region 911 and the replication regions 912, 913, 914 (i.e. a distance of each of the replication regions 912, 913, 914 from the base region 911) may be represented by the offset amounts "xa", "ya". The operator may input the offset amounts "xa", "ya" to the input interface 150. The input offset amounts "xa", "ya" are stored in the storage 160 as positional relationship data which indicates the positional relationship between the base region 911 and the replication regions 912, 913, 914.

The operator may input vertical movement amount data to the input interface 150, the vertical movement amount data representing an amount of vertical movement of the iron tip of the soldering iron 115 in the base region 911. The vertical movement amount data is set for preventing the iron tip of the soldering iron 115 from colliding with the electronic components mounted on the electronic board 900 or for determining an upward and/or downward vertical movement amount of the iron tip during a point soldering operation for adhering dot-shaped solder on the upper surface of the electronic board 900. Immediately before soldering is performed, the iron tip of the soldering iron 115 is situated at a position upwardly distant from the upper surface of the electronic board 900 by a value of the vertical movement amount data. Thereafter, the iron tip of the soldering iron 115 is moved down by the value of the vertical movement amount data, so that soldering is performed at a soldering position. After the soldering, the iron tip of the soldering iron 115 is moved up by the value of the vertical movement amount data. Since the iron tip of the soldering iron 115 departs upward from the upper surface of the electronic board 900 by the value of the vertical movement amount data, the iron tip does not touch the electronic components mounted on the electronic board 900 when the iron tip of the soldering iron 115 subsequently moves horizontally. The vertical movement amount of the iron tip of the soldering iron 115 may be individually set for each soldering position. In this case, the operator may set a vertical movement amount so that the iron tip of the soldering iron 115 does not move in an unnecessary distance in the z-axis direction. For example, if there is a short electronic component at a position on the horizontal movement locus of the iron tip of the soldering iron 115, the operator may set a small value for the vertical movement amount. On the other hand, if there is a tall electronic component, the operator may set a large value as the vertical movement amount. Since the soldering iron 115 does not move in an unnecessarily long distance in the z-axis direction, soldering to the electronic board 900 may be completed in a short time. Alternatively, the vertical movement amount of the iron tip of the soldering iron 115 may be a common value (the same value) for all the soldering positions. For example, the operator may set a value larger than all the heights of electronic components as the vertical movement amount so that the iron tip does not hit the tallest electronic component among the electronic components on the electronic board 900. In this case, the input operation of the vertical movement amount is simplified. With regard to the present embodiment, one of the x-axis and the y-axis may be referred to as the first axis in descriptions below. The other of the x-axis and the y-axis may be referred to as the second axis in descriptions below.

The controller 170 includes a pattern determination portion 171 and a signal generator 172. The pattern determination portion 171 refers to the base pattern data and the vertical movement amount data to determine how to move the iron tip of the soldering iron 115 in the base region 911 (i.e. how to drive the driving portion 180). In order for the driving portion 180 to move the iron tip of the soldering iron 115 in the base region 911, the signal generator 172 generates a base driving signal for moving the soldering iron 115 according to a determined movement pattern. In order for the driving portion 180 to move the iron tip of the soldering iron 115 in the replication regions 912, 913, 914, the signal generator 172 refers to the positional relationship data in the storage 160. On the basis of the positional relationship data and the movement pattern determined for the base region 911 (referred to as the base region movement pattern), the signal generator 172 generates a replication driving signal so that the base region movement pattern of the iron tip on the base region 911 is copied to the replication regions 912, 913, 914. The base driving signal and the replication driving signal are output from the signal generator 172 to the driving portion 180. In response to the base driving signal and the replication driving signal, the driving portion 180 moves the soldering iron 115 and the installation table 125, so that the iron tip of the soldering iron 115 reaches the soldering positions P01 to P16 on the base region 911 and the replication regions 912, 913, 914.

Figure 2:
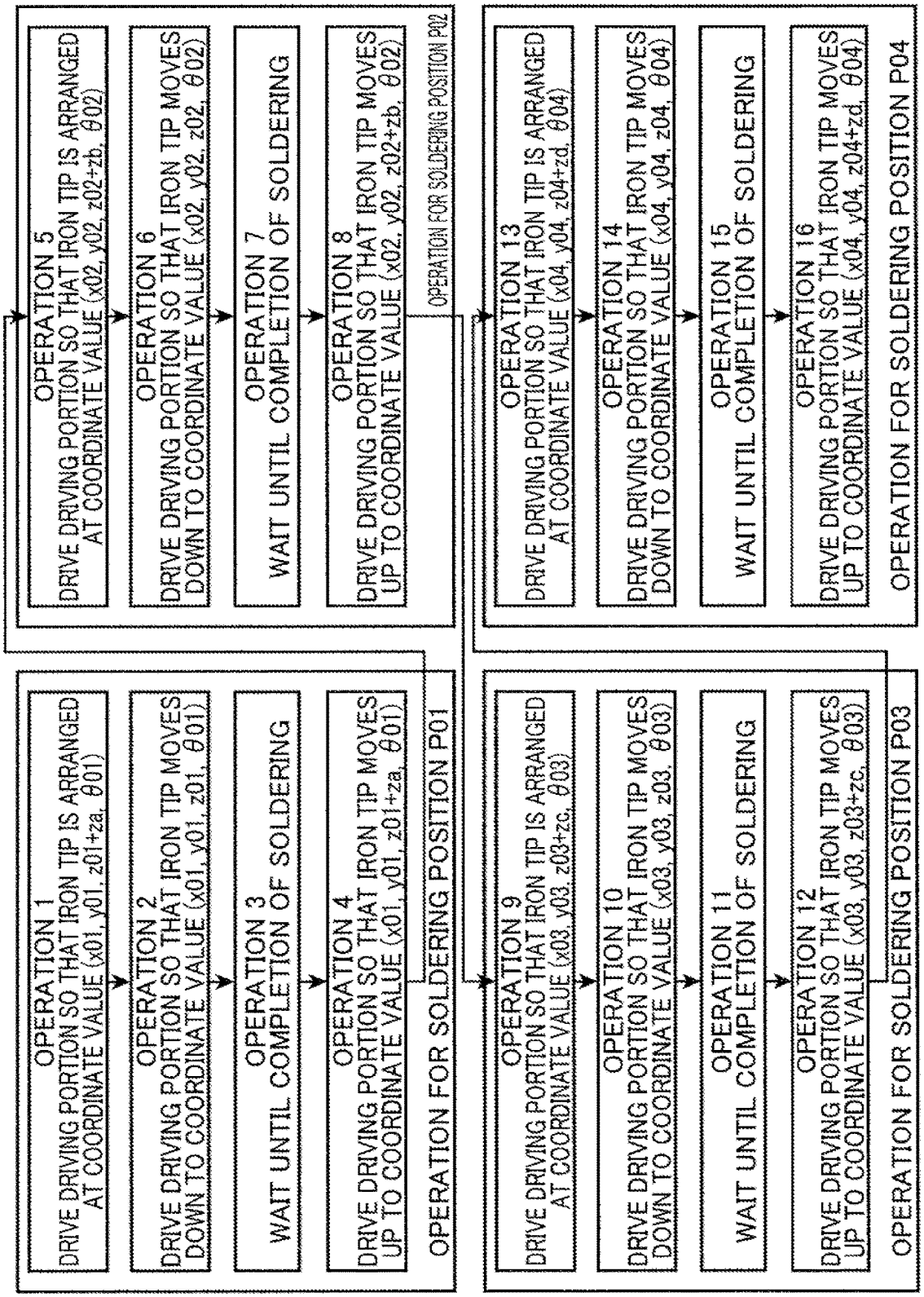
FIG. 2 is a flowchart of an exemplary base region movement pattern determined by a pattern determination portion of the soldering apparatus shown in FIG. 1.

FIG. 2 is a flowchart of an exemplary base region movement pattern determined by the pattern determination portion 171. The pattern determination portion 171 is described below with reference to FIGS. 1, 2, 7 and 8.

A series of operations shown in FIG. 2 represents a base region movement pattern of the soldering iron 115 in the soldering operation after the teaching operation. The soldering iron 115 is moved on the base region 911 according to the series of operations (numbered sequentially from 1 to 16) shown in FIG. 2. The pattern determination portion 171 to which the coordinate value of the soldering position is given may use a predetermined algorithm to determine the series of operations shown in FIG. 2, the algorithm being designed to move the iron tip of the soldering iron 115 to the coordinate value resulting from the teaching operation.

With regard to the soldering apparatus 100 described with reference to FIG. 7, the soldering iron 115 actually moves during the movement of the soldering iron 115 in the x-axis direction and the z-axis direction and the circular movement of the soldering iron 115 around the rotation axis of the holding portion 116. On the other hand, the soldering iron 115 does not actually move in the y-axis direction. Instead, the installation table 125 moves in the y-axis direction. The soldering iron 115 may be relatively displaced in the y-axis direction with respect to the electronic board 900 while the installation table 125 moves in the y-axis direction. In the following description, the term "movement pattern" means not only the actual movement of the soldering iron 115 but also the relative movement of the soldering iron 115 with respect to a surface of the electronic board 900.

"Operation 1" to "operation 4" shown in FIG. 2 represent a movement pattern for the soldering position P01. "Operation 5" to "operation 8" represent a movement pattern for the soldering position P02. "Operation 9" to "operation 12"

represent a movement pattern for the soldering position P03. "Operation 13" to "operation 16" represent a movement pattern for the soldering position P04. "Operation 1" to "operation 16" are sequentially executed by the driving portion 180. Coordinate values (x01, y01, z01, θ01) to coordinate values (x04, y04, z04, θ04) shown in FIG. 2 are resultant from the teaching operation using the operation unit 130.

With regard to the "operation 1", "operation 5", "operation 9" and "operation 13", the pattern determination portion 171 specifies an operation of the driving portion 180 for placing the iron tip of the soldering iron 115 above the soldering positions P01 to P04. With regard to "operation 2", "operation 6", "operation 10" and "operation 14", the pattern determination portion 171 determines an operation of the driving portion 180 to move down the iron tip of the soldering iron 115 to the soldering positions P01 to P04. With regard to "operation 3", "operation 7", "operation 11" and "operation 15", the pattern determination portion 171 designates an operation in which the driving portion 180 stops until the soldering at the soldering positions P01 to P04 is completed. With regard to "operation 4", "operation 8", "operation 12" and "operation 16", the pattern determination portion 171 specifies an operation of the driving portion 180 for placing the iron tip of the soldering iron 115 above the soldering positions P01 to P04.

As shown in FIG. 1, the signal generator 172 includes a first generator 271, a second generator 272, a third generator 273, a fourth generator 274, a pattern analyzer 275 and an offset command portion 276. The first generator 271 generates a driving signal for rotating the iron tip of the soldering iron 115 in a counterclockwise or clockwise direction. The second generator 272 generates a driving signal for moving down or up the iron tip of the soldering iron 115. The third generator 273 generates a driving signal for moving the iron tip of the soldering iron 115 leftward or rightward. The fourth generator 274 generates a driving signal for moving the installation table 125 forward or rearward. The pattern analyzer 275 analyzes the base region movement pattern shown in FIG. 2 to determine which of the first to fourth generators 271-274 is to be given an instruction to generate a driving signal. The instruction and information necessary to generate the driving signal (e.g. a coordinate value of a target position) is given to the selected generator (i.e. any one of the first to fourth generators 271-274) by the pattern analyzer 275. The first to fourth generator 271-274 generate the aforementioned driving signal in accordance with the generation instruction. The offset command portion 276 refers to the positional relationship data stored in the storage 160 to notify the pattern analyzer 275 of positions of the replication regions 912, 913, 914. The pattern analyzer 275 uses positional relationship information (i.e. the offset amounts "xa", "ya") received from the offset command portion 276 to translate the base region movement pattern shown in FIG. 2 to obtain the movement patterns for the replication region 912, 913, 914. The movement patterns for the replication region 912, 913, 914 are referred to as replication region movement patterns. On the basis of the replication region movement patterns, the pattern analyzer 275 determines a target (i.e. any of the first to fourth generators 271-274) of generation instruction of the driving signal.

With regard to "operation 1", "operation 5", "operation 9" and "operation 13" shown in FIG. 2, the pattern analyzer 275 determines the third and/or fourth generators 273, 274 as an output destination (or output destinations) of generation command. At this time, if it is necessary to change an angle of the iron tip of the soldering iron 115 around the rotation axis of the holding portion 116, the pattern analyzer 275 also includes the first generator 271 as the output destination of the generation command. With regard to "operation 2", "operation 4", "operation 6", "operation 8", "operation 10", "operation 12", "operation 14" and "operation 16", the pattern analyzer 275 determines the second generator 272 as the output destination of the generation command.

With regard to the base region movement pattern shown in FIG. 2, the soldering in the base region 911 is performed in the order of the soldering positions P01, P02, P03, P04. However, the order of soldering may be determined by the operator. For example, the order of soldering may be determined according to the order of teaching operations. Alternatively, after the teaching operation, the operator may prioritize the coordinate values resultant from the teaching operation. Therefore, the principle of the present embodiment is not limited to a particular order of soldering in the base region 911.

Figure 3A:
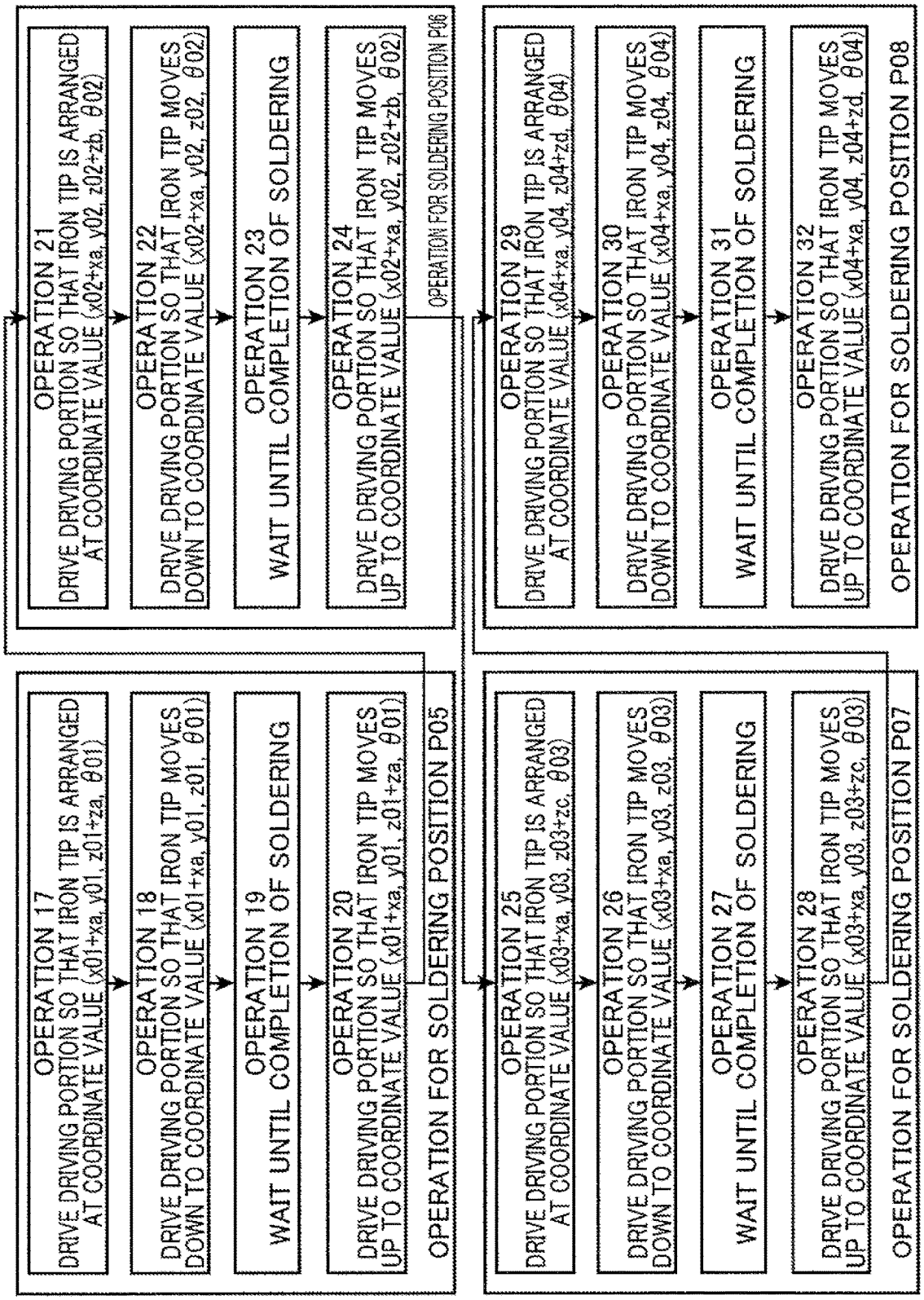
FIG. 3A is a flowchart showing a first replication region movement pattern which a pattern analyzer of the soldering apparatus shown in FIG. 1 has determined by translating the base region movement pattern with an offset amount.
Figure 3B:
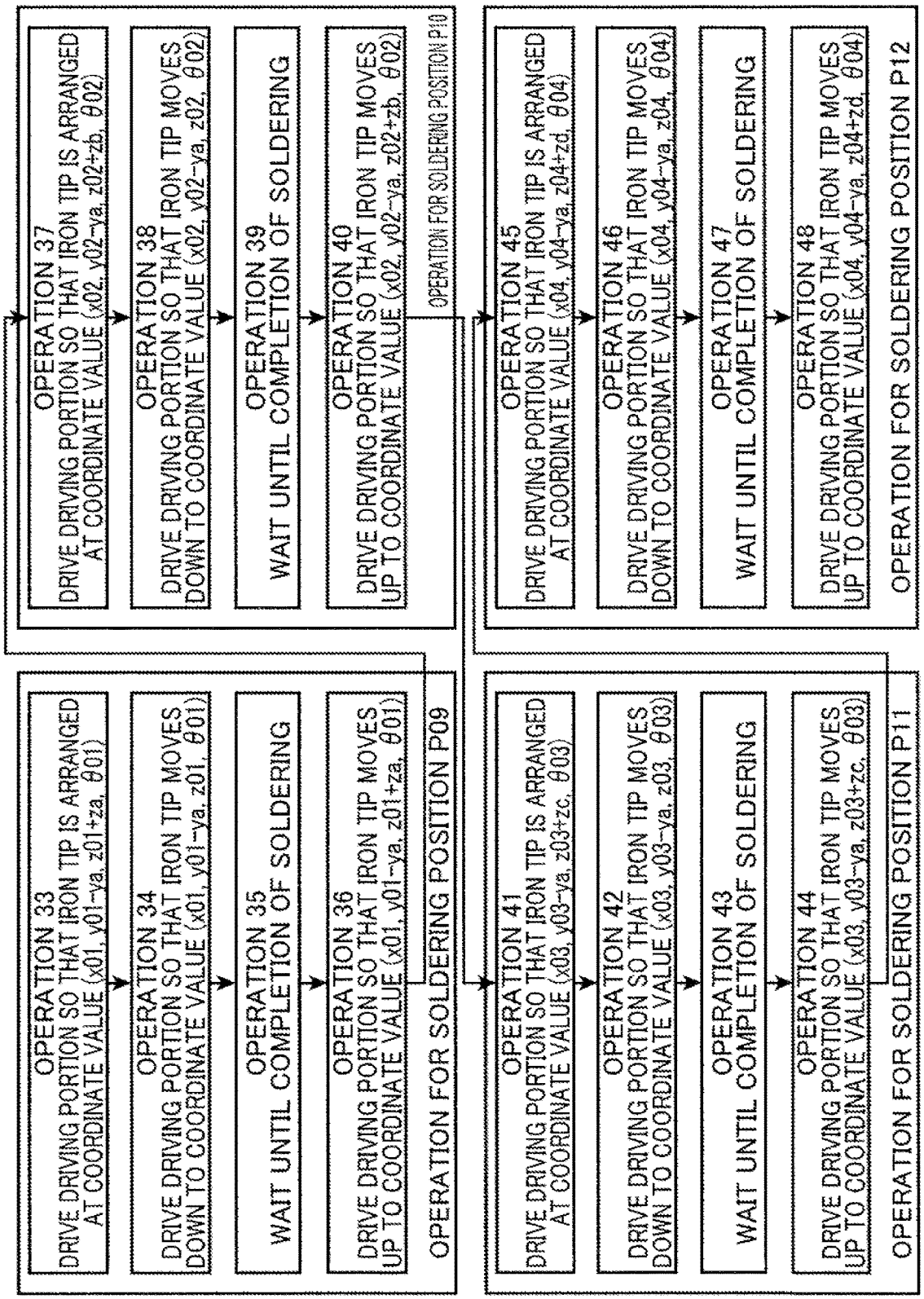
FIG. 3B is a flowchart showing a second replication region movement pattern which the pattern analyzer of the soldering apparatus shown in FIG. 1 has determined by translating the base region movement pattern with an offset amount.

FIGS. 3A to 3C are flowcharts showing replication region movement patterns, which are based on the base region movement pattern having been translated by the pattern analyzer 275 with the offset amounts "xa", "ya". A translation process of the base region movement pattern is described below with reference to FIGS. 1 to 3C, 7 and 8.

The base region movement pattern shown in FIG. 2 is applied to the base region 911 whereas the replication region movement patterns of the soldering iron 115 shown in FIGS. 3A to 3C are applied to the replication regions 912, 913, 914, respectively. In other words, in the soldering operation after the teaching operation, the soldering iron 115 is moved on the replication regions 912, 913, 914 in accordance with a series of operations shown in FIGS. 3A to 3C.

"Operation 17" to "operation 32" shown in FIG. 3A correspond to "operation 1" to "operation 16" described with reference to FIG. 2. Only x coordinate values among coordinate values of "operation 17" to "operation 32" are changed from the coordinate values in "operation 1" to "operation 16". In other words, the x coordinate values of "operation 17" to "operation 32" are obtained by applying the offset amount "xa" in the positive direction of the x-axis to the coordinate values in "operation 1" to "operation 16". Since the replication region 912 is offset from the base region 911 by the offset amount "xa" in the positive direction of the x-axis, when the driving portion 180 operates according to the replication region movement pattern shown in FIG. 3A, the iron tip may move on the replication region 912 by tracing a movement locus of the same pattern as the movement locus drawn by the iron tip on the base region 911.

"Operation 33" to "operation 48" shown in FIG. 3B correspond to "operation 1" to "operation 16" described with reference to FIG. 2. Only y coordinate values of coordinate values of "operation 33" to "operation 48" are changed from the coordinate values of "operation 1" to "operation 16". In other words, the y coordinate values of "operation 33" to "operation 48" are obtained by applying the offset amount "ya" in the negative direction of the y-axis to the coordinate values in "operation 1" to "operation 16". Since the replication region 913 is offset from the base region 911 by the offset amount "ya" in the negative direction of the y-axis, the iron tip may move on the replication region 913 by tracing a movement locus of the same pattern as the movement locus drawn by the iron tip on the base region 911 when the driving portion 180 operates in accordance with the replication region movement pattern shown in FIG. 3B.

"Operation 49" to "operation 64" shown in FIG. 3C correspond to "operation 1" to "operation 16" described with reference to FIG. 2. Only x coordinate values and y coordinate values among coordinate values of "operation 49" to "operation 64" are changed from the coordinate values of "operation 1" to "operation 16". In other words, the x and y coordinate values of the coordinate values of "operation 49" to "operation 64" are obtained by applying the offset amounts "xa", "ya" in the positive direction of the x-axis and the negative direction of the y-axis to the coordinate values of "operation 1" to "operation 16". Since the replication region 914 is offset from the base region 911 by the offset amount "xa" in the positive direction of the x-axis and the offset amount "ya" in the negative direction of the y-axis, the iron tip may move on the replication region 914 by tracing a movement locus of the same pattern as the movement locus drawn by the iron tip on the base region 911 when the driving portion 180 operates according to the replication region movement pattern shown in FIG. 3C.

The driving portion 180 includes a first motor 181, a second motor 182, a third motor 183, a fourth motor 184, a first encoder 185, a second encoder 186, a third encoder 187, and a fourth encoder 188. The first to fourth motors 181-184 receive driving signals from the first to fourth generators 271-274, respectively. The first motor 181 rotates the holding portion 116 so that the iron tip of the soldering iron 115 rotates counterclockwise or clockwise in response to the driving signal from the first generator 271. The second motor 182 moves down or up the vertically movable column 112 in response to the driving signal from the second generator 272. Accordingly, the iron tip of the soldering iron 115 attached to the vertically movable column 112 via the holding portion 116 also moves down or up. The third motor 183 moves the horizontally movable column 111 leftward or rightward in response to the driving signal from the third generator 273. Since the soldering iron 115 is attached to the horizontally movable column 111 via the holding portion 116 and the vertically movable column 112, the iron tip of the soldering iron 115 will move leftward or rightward together with the horizontally movable column ill. The fourth motor 184 moves the installation table 125 forward or rearward in response to the driving signal from the fourth generator 274. Accordingly, a relative position of the iron tip of the soldering iron 115 with respect to the electronic board 990 (on the installation table 125 changes forward or rearward.

The first to fourth encoders 185-188 are respectively attached to the first to fourth motors 181-184 to detect their rotation amounts. Electric signals representing the detected rotation amounts are output from the first to fourth encoders 185-188 to the first to fourth generators 271-274. The first to fourth generators 271-274 refer to the electric signals from the first to fourth encoders 185-188 to perform feedback control on the first to fourth motors 181-184.

With regard to the aforementioned embodiment, the iron tip of the soldering iron 115 moves along the z-axis according to the vertical movement amount data. However, the vertical movement amount data may represent a start point and an end point of the point soldering operation for making dot-shaped solder adhere to the surface of the electronic board 900. Thus, in the case of point soldering, if coordinates representing the start point above the soldering position are specified in the vertical movement amount data in correspondence to the soldering position (i.e. the end point) on the surface of the electronic board 900, the soldering iron 115 may reciprocate from the designated start point to the end point, and then from the end point to the start point.

FIG. 4 is a schematic flowchart showing an exemplary operation of the controller 170. The operation of the controller 170 is described below with reference to FIGS. 1 to 4, 7 and 8.

(Step S105)

Step S105 is performed after completion of the teaching operation on the base region 911. Therefore, the base pattern data, the vertical movement amount data and the positional relationship data are stored in the storage 160. When the soldering operation is started, the pattern determination portion 171 reads the base pattern data and the vertical movement amount data from the storage 160. After that, step S110 is executed.

(Step S110)

The pattern determination portion 171 refers to the base pattern data and the vertical movement amount data to determine the base region movement pattern for the base region 911 (c.f. FIG. 2). The determined base region movement pattern is output from the pattern determination portion 171 to the pattern analyzer 275. After that, step S115 is executed.

(Step S115)

The pattern analyzer 275 analyzes the determined base region movement pattern to determine an output destination of the generation command. With regard to "operation 1" of the base region movement pattern shown in FIG. 2, if it is necessary to change an angular position of the iron tip of the soldering iron 115, the pattern analyzer 275 sets the first generator 271 as the output destination of the generation command. If it is necessary to adjust a vertical movement amount of the iron tip of the soldering iron 115 (i.e. a distance between the upper surface of the electronic board 900 and the iron tip of the soldering iron), the pattern analyzer 275 sets the second generator 272 as the output destination of the generation command. If the iron tip of the soldering iron 115 has to be moved in the x-axis direction, the pattern analyzer 275 determines the third generator 273 as the output destination of the generation command. If the installation table 125 has to be moved in the y-axis direction, the pattern analyzer 275 determines the fourth generator 274 as the output destination of the generation command. The generation command is output to the output destination (at least one of the first to fourth generators 271-274) determined by the pattern analyzer 275 together with the target coordinate value. After that, step S120 is executed.

(Step S120)

If the first generator 271 has received the generation command, the first generator 271 generates a base driving signal so that the iron tip of the soldering iron 115 reaches an angular position corresponding to a target value of the angular position (the angular coordinate value "001" with respect to "operation 1" in FIG. 2). If the second generator 272 has received the generation command, the second generator 272 generates a base driving signal so that the iron tip of the soldering iron 115 reaches a position corresponding to a target value of z coordinates (the z coordinate value "z01+za" with respect to "operation 1" in FIG. 2). If the third generator 273 has received the generation command, the third generator 273 generates a base driving signal so that the iron tip of the soldering iron 115 reaches a position corresponding to a target value of x coordinates (the x coordinate value "x01" with respect to "operation 1" in FIG. 2). If the fourth generator 274 has received the generation command, the fourth generator 274 generates a base driving signal so that the iron tip of the soldering iron 115 reaches a position corresponding to a target value of y coordinates (the y coordinate value "y01" with respect to "operation 1"

in FIG. 2). These base driving signals are output to the first to fourth motors 181-184, respectively. The first to fourth motors 181-184 operate in response to these base driving signals. With respect to "operation 1" in FIG. 2, the iron tip of the soldering iron 115 reaches the position corresponding to the target coordinate value (x01, y01, z01+za, θ01) as a result of the operations of the first to fourth motors 181-184 in response to the base driving signals. The pattern analyzer 275 may monitor signal generation processes of the first to fourth generators 271-274 to determine whether the first to fourth motors 181-184 have completed the operation for allowing the iron tip of the soldering iron 115 to reach the position corresponding to the target coordinate value. When the pattern analyzer 275 determines that the iron tip of the soldering iron 115 has reached the target coordinate value, step S125 is executed.

(Step S125)

The pattern analyzer 275 determines whether or not the series of operations determined for the target soldering position ("operation 1" to "operation 4" with respect to the soldering position P01 shown in FIG. 8) has been completed. If the series of operations defined for the target soldering position has been completed, step S130 is executed. Otherwise, step S115 is executed.

With respect to the soldering position P01 shown in FIG. 8, a processing loop including steps S115 to S125 is repeated until "operation 4" is completed. In other words, after the aforementioned processes for "operation 1" (c.f. the aforementioned steps S115, S120), the processes for "operation 2", "operation 3" and "operation 4" are sequentially executed.

With regard to "operation 2", the pattern analyzer 275 determines the second generator 272 as the output destination of the generation command to generate a generation command for indicating that the iron tip of the soldering iron 115 is moved down from the position corresponding to the z coordinate value "z01+za" to the position corresponding to the z coordinate value "z01". The generation command is output from the pattern analyzer 275 to the second generator 272. In accordance with the generation command from the pattern analyzer 275, the second generator 272 generates a base driving signal for moving down the iron tip from the position corresponding to the z coordinate value "z01+za" to the position corresponding to the z coordinate value "z10". The second motor 182 moves down the iron tip of the soldering iron 115 to the position corresponding to the z coordinate value "z01" in response to the base driving signal from the second generator 272.

With regard to "operation 3", the pattern analyzer 275 stops output of the generation command for a predetermined period and waits for completion of the soldering at the soldering position P01. The pattern analyzer 275 may refer to a signal from the solder feeder 114 to determine completion of the soldering or may stop the output of the generation command for the predetermined period on the basis of a signal from a timer element.

With regard to "operation 4", the pattern analyzer 275 determines the second generator 272 as the output destination of the generation command to generate a generation command for indicating that the iron tip of the soldering iron 115 is moved up from the position corresponding to the z coordinate value "z01" to the position corresponding to the z coordinate value "z01+za". The generation command is output from the pattern analyzer 275 to the second generator 272. In accordance with the generation command from the pattern analyzer 275, the second generator 272 generates a base driving signal for moving up the iron tip from the position corresponding to the z coordinate value "z01" to the position corresponding to the z coordinate value "z01+za". The second motor 182 moves up the iron tip of the soldering iron 115 to the position corresponding to the z coordinate value "z01+za" in response to the base driving signal from the second generator 272.

(Step S130)

The pattern analyzer 275 determines whether or not the soldering at all the soldering positions in the base region (the soldering positions P01 to P04 on the base region 911 shown in FIG. 8) has been completed. If execution of the base region movement pattern determined in step S110 has been completed, step S135 is executed. Otherwise, step S115 is executed.

With respect to the base region 911 shown in FIG. 8, a processing loop including steps S115 to S130 is repeated until the soldering at the soldering position P04 is completed. When soldering is changed from the soldering position P01 to the soldering position P02 (i.e. at the time of transition from "operation 4" to "operation 5"), the pattern analyzer 275 confirms whether the z coordinate value "z01+za" and the angular coordinate value "θ01" set for "operation 4" are equal to the z coordinate value "z02+zb" and the angular coordinate value "θ02" set for "operation 5", respectively. If these z coordinate values are not coincident, the pattern analyzer 275 determines an output destination of the generation command to be the second generator 272. Thereafter, the second motor 182 displaces the iron tip of the soldering iron 115 in the z-axis direction in response to the base driving signal generated by the second generator 272. If the angular coordinate value "θ01" is not equal to the angular coordinate value "θ02", the pattern analyzer 275 determines the output destination of the generation command to be the first generator 271. The first motor 181 makes the iron tip of the soldering iron 115 go around the rotation axis of the holding portion 116 in response to the base driving signal generated by the first generator 271.

If the z coordinate value "z01+za" and the angular coordinate value "θ01" set for "operation 4" are equal to the z coordinate value "z02+zb" and the angular coordinate value "θ02" set for "operation 5", respectively, processes for horizontal movement of the iron tip of the soldering iron 115 are performed without causing displacement of the iron tip of the soldering iron 115 along the z-axis and without causing circular movement of the iron tip of the soldering iron 115 around the rotation axis of the holding portion 116. At this time, the pattern analyzer 275 designates the third and fourth generators 273, 274 as output destinations of the generation command. In accordance with the generation command, the third generator 273 generates and outputs a base driving signal for moving the iron tip of the soldering iron 115 in the positive direction of the x-axis. Accordingly, the third motor 183 moves the iron tip of the soldering iron 115 rightward, so that the iron tip reaches a position corresponding to the x coordinate value "x02". The fourth generator 274 generates and outputs a base driving signal for moving the installation table 125 in the positive direction of the y-axis. Since the fourth motor 184 moves the installation table 125 forward in response to the base driving signal generated by the fourth generator 274, the iron tip of the soldering iron 115 moves rearward (i.e. in the negative direction of the y-axis) relatively to the electronic board 900 on the installation table 125. Accordingly, the iron tip reaches a position corresponding to the y coordinate value "y02".

The same processes are performed when the soldering is changed from the soldering position P02 to the soldering position P03 (i.e. at the time of transition from "operation 8" to "operation 9") and when the soldering is changed from the soldering position P03 to the soldering position P04 (i.e. at the time of transition from "operation 12" to "operation 13"). After these changing processes of soldering position, the processes for "downward movement of the iron tip", "temporary stop of the iron tip", and "upward movement of the iron tip" described in the context of the processing loop including steps S15 to S125 are executed.

(Step S135)

The pattern analyzer 275 notifies the offset command portion 276 that the soldering in the base region 911 has been completed. In accordance with the notification from the pattern analyzer 275, the offset command portion 276 and the pattern analyzer 275 set a count value "n" to "1", the count value "n" being used in processes for counting the processed replication regions (the replication regions 912, 913, 914 shown in FIG. 8). After that, step S140 is executed.

(Step S140)

The offset command portion 276 reads the positional relationship data from the storage 160. After that, step S145 is executed.

(Step S145)

The offset command portion 276 calculates an offset amount for an nth replication region. With respect to the electronic board 900 described with reference to FIG. 8, the soldering is performed in the order of the replication regions 912, 913, 914. Therefore, when the count value "n" is "1", the soldering is performed on the replication region 912. When the count value "n" is "2", the soldering is performed on the replication region 913. When the count value "n" is "3", the soldering is performed on the replication region 914.

As shown in FIG. 8, a positional difference of the replication region 912 from the base region 911 is "xa" in the x-axis direction whereas it is "0" in the y-axis direction. Therefore, when the count value "n" is "1" (i.e. when the soldering is executed in the replication region 912), the offset command portion 276 notifies that an offset amount in the x-axis direction is "xa" and an offset amount in the y-axis direction is "0". A positional difference of the replication region 913 from the base region 911 is "0" in the x-axis direction whereas it is "ya" in the y-axis direction. Therefore, when the count value "n" is "2" (i.e. when the soldering is executed in the replication region 913), the offset command portion 276 notifies that the offset amount in the x-axis direction is "0" and the offset amount in the y-axis direction is "ya". A positional difference of the replication region 914 from the base region 911 is "xa" and "ya" in the x-axis direction and the y-axis direction. Therefore, when the count value "n" is "3" (i.e. when the soldering is performed in the replication region 913), the offset command portion 276 notifies that the offset amounts in the x-axis direction and the y-axis direction are "xa" and "ya", respectively. When the offset amount for the replication region to be processed (i.e. the nth replication region) is output from the offset command portion 276 to the pattern analyzer 275, step S150 is executed.

(Step S150)

The pattern analyzer 275 translates the base region movement pattern determined in step S110 on the basis of the offset amount notified from the offset command portion 276. Accordingly, when the count value "n" is "1", the replication region movement pattern described with reference to FIG. 3A is obtained. When the count value "n" is "2", the replication region movement pattern described with reference to FIG. 3B is obtained. When the count value "n" is "3", the replication region movement pattern described with reference to FIG. 3C is obtained. After translating the base region movement pattern to obtain the replication region movement pattern, a processing loop including steps S155 to S170 is executed.

(Processing Loop Including Steps S155 to S170)

The processing loop including steps S155 to S170 is the same as the processing loop for steps S115 to S130. Therefore, the iron tip of the soldering iron 115 may move with tracing a movement locus of the same pattern as the movement locus drawn by the iron tip of the soldering iron 115 in the base region 911 at a position different by the offset amount obtained in step S145. Since the coordinate data (i.e. the base pattern data) resultant from the teaching operation performed on the base region 911 is used for setting the movement locus of the iron tip of the soldering iron 115 for the replication regions 912, 913, 914, the teaching operation for the replication regions 912, 913, 914 is not required. Therefore, the soldering apparatus 100 may significantly reduce the required amount of effort and time expended by the user in completing the teaching operation as compared with the conventional soldering apparatus requiring the teaching operation for all the soldering positions. After completion of the processing loop including steps S155 to S170 (i.e. after the soldering is completed at all the soldering positions in the nth replication region), step S175 is executed.

(Step S175)

The pattern analyzer 275 checks whether the count value "n" is equal to a total number "N" of replication regions (N=3 with respect to the electronic board 900 shown in FIG. 2). If the count value "n" is equal to the total number "N", the soldering processes are completed (i.e. the soldering is performed at all the soldering positions on the electronic board 900). Otherwise, step S180 is executed.

(Step S180)

The pattern analyzer 275 and the offset command portion 276 increment the count value "n" by "I". After that, step S145 is executed. Accordingly, the soldering to a subsequent replication region is started.

<Other Features>

Various features may be given to the soldering apparatus 100. The following features do not limit a design principle of the soldering apparatus 100 at all.

(Various Division Patterns of Electronic Board)

The electronic board 900 described with reference to FIG. 8 is divided into soldering regions of two rows and two columns. However, the principle of the aforementioned embodiment is applicable to various division patterns of the electronic board 900.

FIG. 5 is a schematic plan view of the electronic board 900. Another division pattern for the electronic board 900 is described below with reference to FIGS. 1, 4, 5, 7 and 8.

The electronic board 900 shown in FIG. 5 is divided by a division pattern of Ny rows and Nx columns. In other words, the electronic board 900 includes (Nx×Ny) soldering regions. One of these soldering regions is set as a base region. Like FIG. 8, the base region shown in FIG. 5 is a rectangular region forming a left front corner portion of the electronic board 900. Before the soldering operation, the operator may input items shown in the following table as positional relationship data.

TABLE 4

| Input item | Description |
| --- | --- |
| Offset amount: xa | spacing of adjacent soldering regions in x-axis direction |
| Offset amount: ya | spacing of adjacent soldering regions in y-axis direction |
| Total number of columns: Nx (Nx is natural number) | Total number of soldering regions aligned in x-axis direction |
| Total number of rows: Ny (Ny is natural number) | Total number of soldering regions aligned in y-axis direction |
| Soldering sequential order | 0th in order is given to base region as default value, meaning that the base region is solder first. First to (Nx × Ny − 1)th in order are assigned to replication regions, meaning that the replication regions are soldered sequentially, one by one, after the base region. |

On the basis of the data representing "total number of columns" and "total number of rows" shown in "Table 4", the offset command portion 276 determines a coefficient matrix for calculating an offset amount of each of replication regions with respect to the base region. The following mathematical expression shows the coefficient matrix.

$$\begin{pmatrix} Cx \\ Cy \end{pmatrix}_{(nx,ny)} = \begin{pmatrix} nx \\ ny \end{pmatrix}$$ [Mathematical Expression 1]

Cx: Coefficient to offset amount xa
Cy: Coefficient to offset amount ya
nx: Natural number assigned to column
ny: Natural number assigned to row Each replication region has coefficients "Cx" and "Cy." The offset command portion 276 sets the coefficient "Cx" to "1" for the replication regions located at the column (i.e., nx=1) which is the closest to the base region in the x-axis direction. The offset command portion 276 sets the coefficient "Cx" to "2" for the replication regions located at the second closest column (i.e., nx=2) to the base region in the x-axis direction. Likewise, the offset command portion 276 sets the coefficient "Cx" to "Nx−1" for the replication regions located at the (Nx−1)th closest column to the base region in the x-axis direction. The offset command portion 276 sets the coefficient "Cy" to "1" for the replication regions located at the row (i.e., ny=1) which is the closest to the base region in the y-axis direction. The offset command portion 276 sets the coefficient "Cy" to "2" for the replication regions located at the second closest row (i.e., ny=2) to the base region in the y-axis direction. Likewise, the offset command portion 276 sets the coefficient "Cy" to "Ny−1" for the replication regions located at the (Ny−1)th closest row to the base region in the y-axis direction. In the descriptions below, the first region number data is one of "total number of columns" and "total number of rows" in "Table 4". The second region number data is another of "total number of columns" and "total number of rows" in "Table 4". For example, the first region number can be "total number of columns" (which is equal to the numerical quantity of soldering regions within a row), and the second region number can be "total number of rows" (which is equal to the numerical quantity of soldering regions within a column). The first offset data is one of the offset amounts "xa", "ya" in "Table 4". The second offset data is another of the offset amounts "xa", "ya" in "Table 4". For example, the first offset data can be "xa" (the spacing of adjacent regions within a row), and the second offset data can be "ya" (the spacing of adjacent regions within a column).

The offset command portion 276 uses the offset amounts "xa", "ya" and the coefficient matrix to calculate offset amounts "xb", "yb" output to the pattern analyzer 275. The following matrix is an expression for calculating the offset amounts "xb", "yb" from the base region.

$$(xb \quad yb) =$$ [Mathematical Expression 2]
$$(xa \quad ya)\begin{pmatrix} Cx \\ Cy \end{pmatrix}_{(nx,ny)} = (xa \times nx \quad ya \times ny)$$

xb: Offset amount from base region
yb: Offset amount from base region

In "Mathematical Expression 2", "nx" and "ny" are natural numbers for specifying positions of the replication regions divided in a matrix, so that a pair of offset amounts "xb", "yb" from the base region is different for each of the replication regions.

In step S140 shown in FIG. 4, the offset command portion 276 reads the positional relationship data (c.f. "Table 4") from the storage 160. The offset command portion 276 may determine the division pattern and the soldering order of the electronic board 900 from "total number of columns" and "total number of rows" of the positional relationship data (c.f. FIG. 5).

The count value "n" described with reference to FIG. 4 corresponds to the soldering order. Therefore, in step S145 described with reference to FIG. 4, the offset command portion 276 may find the replication region to be processed with reference to the count value "n" and the "soldering order" of the positional relationship data. In other words, if the count value "n" is "1," the replication region to be soldered corresponds to that labeled as "soldering order: 1" in FIG. 5. Consequently, the offset command portion 276 recognizes the replication region located at the 0th column and the first row (nx=0, ny=1) as the replication region to be processed. If the count value "n" is "(Nx−3)×Ny", the offset command portion 276 may recognize the replication region located at the (Nx−3)th column and the (Ny−1)th row (nx=Nx−3, ny=Ny−1) as the replication region to be processed. For the replication region to be processed, the offset command portion 276 may determine (nx, ny) on the basis of the column and row where the replication region is located. After determining (nx, ny) for the replication region to be processed, the offset command portion 276 calculates offset amounts (xb, yb) based on the matrix in "Mathematical Expression 2". The calculated offset amounts (xb, yb) are output from the offset command portion 276 to the pattern analyzer 275.

In step S150 shown in FIG. 4, the pattern analyzer 275 linearly translates the movement locus of the iron tip of the soldering iron 115 set in the base region by "xb" in the x-axis direction and "yb" in the y-axis direction to determine a replication region movement pattern which will allow movement of the iron tip along a movement locus in the replication region. In the processing loop including steps S155 to S170, a replication driving signal for the determined replication region movement pattern is generated. The driving portion 180 moves the soldering iron 115 and the installation table 125 in response to the replication driving signal. Accordingly, the iron tip of the soldering iron 115 may move along the movement locus which is a linear translation of the movement locus set on the base region. As a result of execution of a processing loop including steps S140 to S180 shown in FIG. 4, soldering to the replication regions set on the electronic board 900 is sequentially completed according to the soldering order set by the operator. In step S175, when the count value "n" becomes equal to "Nx×Ny−1", soldering to all the replication regions set on the electronic board 900 is completed, so that the processes of the controller 170 is completed.

FIG. 6 is an exemplary image displayed by the input interface 150 for user input of the input item shown in "Table 4". An input image displayed by the input interface 150 is described below with reference to FIGS. 1, 5 and 6.

FIG. 6 shows four input windows 151, 152, 153, 154 and one display window 155.

The operator may input the "total number of columns" shown in "Table 4" in the input window 151. The operator may input the "total number of rows" shown in "Table 4" in the input window 152. The operator may input a value of the offset amount "xa" shown in "Table 4" in the input window 153. The operator may input a value of the offset amount "ya" shown in "Table 4" in the input window 154.

The display window 155 represents a soldering route which is associated with the soldering order shown in "Table 4". According to the soldering route shown in FIG. 6, the soldering is first performed on soldering regions aligned in the 0th row. Thereafter, the soldering is performed for soldering regions aligned in the first row, and then the second row, and so on. Eventually, the soldering is performed for soldering regions aligned in the (Ny−1)th row, which is the last row. This differs from the example of FIG. 5, in which soldering is first performed on soldering regions aligned in the 0th column, then the first column, then the second column, and so on.

Since the offset command portion 276 automatically determines the soldering order on the basis of the soldering route, the operator does not have to individually set the soldering sequential order for the soldering regions. Therefore, setting of the soldering sequential order is not excessively complicated.

The operator may operate the input interface 150 to change a pattern of the soldering route displayed in the display window 155. In other words, mutually different patterns are prepared in advance as the soldering route. Since the operator may select a pattern which is the most suitable for the soldering operation as the soldering route, appropriate soldering is performed. For example, the operator may select as the soldering route a pattern which defines a soldering order suitable for a mounting order of electronic components.

With regard to the aforementioned embodiment, there are the four soldering positions P01 to P04 in the base region 911. However, there may be one soldering position in the base region 911. Therefore, the principle of the aforementioned embodiment is not limited at all by how many soldering positions are in the base region 911.

With regard to the aforementioned embodiment, the point soldering operation for adhering dot-shaped solder on the electronic board 900 is performed for each of the soldering positions P01 to P16. However, the aforementioned palletizing function may be also applied to a wire soldering operation in which a line of solder is adhered to the electronic board 900. Therefore, the principle of the aforementioned embodiment is not limited to a specific soldering operation on the electronic board 900.

With regard to the aforementioned embodiment, the soldering apparatus 100 includes the operation unit 130. Since the operation unit 130 gives the operator (user) a tactile sense of movement direction based on how the operator tilts and rotates the control levers, the operator may move the soldering iron 115 while constantly looking at the iron tip of the soldering iron 115. This allows the operator to visually confirm the position of the iron tip during movement. Since the soldering apparatus 100 enables the operator to confirm a position of the iron tip and operate (move) the soldering iron 115 at the same time, the operator may efficiently perform the teaching operation. However, the aforementioned palletizing function may be incorporated into a general soldering apparatus without the operation unit 130. Therefore, the principle of the aforementioned embodiment is not limited to a specific structure of the soldering apparatus 100.

With regard to the aforementioned embodiment, the electronic board 900 is divided into a matrix. However, the palletizing function may be also used under other division patterns. In other words, if there are an arrangement pattern of the soldering position, at which the teaching operation is performed, and the same arrangement pattern as the arrangement pattern at a different position on the electronic board 900, the operator may use the aforementioned palletizing function to perform a teaching operation for a smaller number of soldering positions than the conventional teaching operation. Therefore, the principle of the aforementioned embodiment is not limited to a specific division pattern virtually set on the electronic board 900.

The aforementioned non-limiting embodiment mainly includes a soldering apparatus having the following configuration.

A soldering apparatus according to one aspect of the aforementioned embodiment includes: a soldering iron configured to perform soldering on a surface of an electronic board including soldering regions, the soldering regions having a base region, which has at least one soldering position, and at least one replication region, which includes an arrangement pattern in common to an arrangement pattern of the at least one soldering position of the base region and exists at a position different from the base region; a driving portion configured to move the soldering iron; an input portion configured to receive input of positional relationship data, which represents a positional relationship between the base region and the at least one replication region, and base pattern data, which represents the arrangement pattern of the at least one soldering position in the base region; and a controller configured to control the driving portion based on the base pattern data and the positional relationship data in a soldering operation. The controller (i) determines a base region movement pattern based on the base pattern data in order to move the soldering iron to the at least one soldering position of the base region, (ii) controls the driving portion so that the soldering iron moves according to the determined base region movement pattern of the base region, and (iii) controls the driving portion based on the positional relationship data and the determined base region movement pattern so that the soldering iron is moved in the at least one replication region.

According to the aforementioned configuration, since the base region is used as a region for storing the at least one soldering position, an operator inputs the base pattern data to the input portion, the base pattern data representing the arrangement pattern of the at least one soldering position in the base region. Accordingly, the controller may determine the soldering position in the base region. Therefore, on the basis of the base pattern data, the controller may determine the base region movement pattern for moving the soldering iron to the at least one soldering position of the base region. Since the controller controls the driving portion so that the soldering iron moves in the base region according to the determined base region movement pattern, the soldering iron may move according to the determined base region movement pattern to perform soldering at the at least one soldering position of the base region in the soldering operation.

Since the positional relationship data input to the input portion represents the positional relationship between the base region and the at least one replication region existing at the position different from the base region, the controller referring to the positional relationship data may determine a relative position of the at least one replication region to the base region. Therefore, on the basis of the positional relationship data representing the positional relationship between the base region and the at least one replication region, the controller may control the driving portion so that the movement of the soldering iron following the base region movement pattern determined for the base region is performed in the at least one replication region. Accordingly, in the soldering operation after a teaching operation, the soldering iron may move according to the base region movement pattern determined for the base region to perform soldering in the at least one replication region. Since the replication region includes the arrangement pattern in common to the arrangement pattern of the at least one soldering position of the base region, the soldering iron moving according to the base region movement pattern determined for the base region may perform soldering in correspondence to a pattern of a soldering position in the replication region.

As described above, even if the soldering position in correspondence to the at least one replication region is not input to the input portion, the soldering apparatus may perform soldering at the soldering position in the at least one replication region. Therefore, the soldering apparatus may effectively reduce labor of the operator inputting the soldering positions.

With regard to the aforementioned configuration, the controller may include (i) a pattern determination portion configured to determine the base region movement pattern of the base region based on the base pattern data, and (ii) a signal generator configured to generate a base driving signal, which is used for operating the driving portion so that the soldering iron moves in the base region according to the determined base region movement pattern, and a replication driving signal, which is used for operating the driving portion so that the soldering iron moves to the at least one replication region based on the positional relationship data and the determined base region movement pattern and then moves in the at least one replication region according to the determined base region movement pattern. The driving portion may move the soldering iron in response to the base driving signal and the replication driving signal.

According to the aforementioned configuration, since the operator inputs the base pattern data to the input portion as described above, the pattern determination portion of the controller may determine the soldering position in the base region. Therefore, the pattern determination portion may determine the base region movement pattern for moving the soldering iron to the at least one soldering position in the base region on the basis of the base pattern data. Since the signal generator generates the base driving signal so that the soldering iron moves according to the determined base region movement pattern, the driving portion may move the soldering iron in response to the base driving signal. Accordingly, the soldering iron may perform soldering on at the at least one soldering position in the base region.

Since the positional relationship data input to the input portion represents the positional relationship between the base region and the at least one replication region virtually duplicated at a position different from the base region, the signal generator of the controller referring to the positional relationship data may determine a relative position of the at least one replication region with respect to the base region. Therefore, the signal generator may generate the replication driving signal to control the driving portion so that the soldering iron moves to the at least one replication region. Since the signal generator generates the replication driving signal so that the soldering iron moves according to the base region movement pattern determined for the base region in the at least one replication region as well, the driving portion operating in response to the replication driving signal may cause the soldering iron to perform the same moving operation as the moving operation in the base region for the at least one replication region as well. Therefore, a soldering operation similar to the soldering operation performed in the base region may be also performed for the at least one replication region.

With regard to the aforementioned configuration, the positional relationship data may include region number data, which represents a number of regions including the base region and the at least one replication region aligned along a predetermined axis from the base region, and offset data, which represents a gap between two adjacent regions among the regions. The signal generator may refer to the region number data and the offset data to generate the base driving signal and the replication driving signal so that the soldering iron moves in each of the regions according to the determined base region movement pattern.

According to the aforementioned configuration, the region number data of the positional relationship data represents the number of the regions including the base region and the at least one replication region aligned along the predetermined axis from the base region, so that the signal generator referring to the positional relationship data may determine how many times the replication driving signal should be generated. Since the offset data represents the gap between two adjacent regions among the regions, the signal generator referring to the positional relationship data may determine a position of each of the regions aligned along the predetermined axis. Therefore, the signal generator may refer to the region number data and the offset data to generate the replication driving signal so that the base region movement pattern determined for the base region is applied to each of the regions. Accordingly, a soldering operation similar to the soldering operation performed in the base region may be also performed in the at least one replication region aligned along the predetermined axis from the base region. Even if the teaching operation is not performed for all of the regions aligned along the predetermined axis, a common soldering operation is performed for the regions aligned along the predetermined axis. Accordingly, the aforementioned soldering apparatus may effectively reduce labor of the operator performing the teaching operation.

With regard to the aforementioned configuration, the positional relationship data may include first region number data, which represents a number of first regions including the base region and the at least one replication region aligned along a predetermined first axis from the base region, and first offset data, which represents a gap between two adjacent regions among the first regions. The signal generator may refer to the first region number data and the first offset data to generate the base driving signal and the replication driving signal so that the soldering iron moves in each of the first regions according to the determined base region movement pattern.

According to the aforementioned configuration, the first region number data of the positional relationship data represents the number of the first regions including the base region and the at least one replication region aligned along the predetermined first axis from the base region. Therefore, the signal generator referring to the positional relationship data may determine how many times the replication driving signal should be generated. Since the first offset data represents the gap between two adjacent regions among the first regions, the signal generator referring to the positional relationship data may determine a position of each of the first regions aligned along the first axis. Therefore, the signal generator refers to the first region number data and the first offset data to generate the replication driving signal so that the base region movement pattern determined for the base region is applied to each of the first regions. Accordingly, a soldering operation similar to the soldering operation performed in the base region may be also performed in the at least one replication region aligned along the first axis from the base region. Even if a teaching operation is not performed for all of the first regions aligned along the first axis, a common soldering operation is performed for the first regions aligned along the first axis. Accordingly, the aforementioned soldering apparatus may effectively reduce labor of the operator performing the teaching operation.

With regard to the aforementioned configuration, the positional relationship data may include second region number data, which represents a number of second regions including the base region and the at least one replication region aligned along a second axis orthogonal to the first axis from the base region, and second offset data, which represents a gap between two adjacent regions among the second regions. The signal generator may refer to the second region number data and the second offset data to generate the base driving signal and the replication driving signal so that the soldering iron moves in each of the second regions according to the determined base region movement pattern.

According to the aforementioned configuration, the second region number data of the positional relationship data represents the number of the second regions including the base region and the at least one replication region aligned along the second axis orthogonal to the first axis from the base region. Therefore, the signal generator referring to the positional relationship data may determine how many times the replication driving signal should be generated. Since the second offset data represents the gap between two adjacent regions among the second regions, the signal generator referring to the positional relationship data may determine a position of each of the second regions aligned along the second axis. Therefore, the signal generator may refer to the second region number data and the second offset data to generate the replication driving signal so that the base region movement pattern determined for the base region is applied to each of the second regions. Accordingly, a soldering operation similar to the soldering operation performed in the base region may be also performed in the at least one replication region aligned along the second axis from the base region. Even if a teaching operation is not performed for all of the second regions aligned along the second axis, a common soldering operation is performed for the second regions aligned along the second axis. Accordingly, the aforementioned soldering apparatus may effectively reduce labor of the operator performing the teaching operation.

With regard to the aforementioned configuration, the input portion may receive input of vertical movement amount data, which represents a movement amount of the soldering iron when the soldering iron moves upward from the surface of the electronic board after soldering at the at least one soldering position of the base region. The pattern determination portion may refer to the vertical movement amount data to determine the base region movement pattern so that the soldering iron moves upward for each soldering. The replication driving signal generated by the signal generator may operate the driving portion so that the soldering iron moves in the at least one replication region according to the determined base region movement pattern and moves the soldering iron upward for each soldering in the at least one replication region.

According to the aforementioned configuration, since the vertical movement amount data represents the movement amount when the soldering iron after the soldering moves upward from the surface of the electronic board, the pattern determination portion referring to the vertical movement amount data may determine the base region movement pattern of the driving portion so that the soldering iron after the soldering departures upward from the surface of the electronic board. The soldering iron may move up and down toward the soldering position in the base region to make dot-shaped solder adhere on the surface of the electronic board.

Since the replication driving signal generated by the signal generator operates the driving portion so that the soldering iron moves in the at least one replication region in accordance with the determined base region movement pattern, the soldering iron may also move upward for each soldering even in the at least one replication region. The soldering iron may move up and down toward the soldering position in the replication region to make the dot-shaped solder adhere on the surface of the electronic board.

With regard to the aforementioned configuration, when the base pattern data includes coordinate values, which respectively represent a first soldering position and a second soldering position existing at a position different from the first soldering position, as a coordinate value representing the at least one soldering position, the input unit may receive input of mutually different values for the first and second soldering positions as the vertical movement amount data.

According to the aforementioned configuration, since the input portion receives input of the mutually different values for the first and second soldering positions as the vertical movement amount data, the operator may individually input vertical movement amounts required at the first and second soldering positions. Since the soldering iron does not move upward unnecessarily large, it takes short to move the soldering iron, so that the soldering operation becomes efficient.

With regard to the aforementioned configuration, when the base pattern data includes coordinate values, which respectively represent a first soldering position and a second soldering position existing at a position different from the first soldering position, as a coordinate value representing the at least one soldering position, the input portion collectively may receive input of a common value for the first and second soldering positions as the vertical movement amount data.

According to the aforementioned configuration, since the input portion collectively receives input of the common value for the first and second soldering positions as the vertical movement amount data, the operator need not individually set the vertical movement amounts of the soldering iron for the first and second soldering positions. Therefore, the operator may set the moving amounts of the soldering iron in a short time.

With regard to the aforementioned configuration, the input portion may receive designation of an order of soldering to the soldering regions. The driving portion may move the soldering iron under control of the controller so that the soldering iron performs soldering in the soldering regions according to the designated order.

According to the aforementioned configuration, since the input portion receives the designation of the order to the soldering regions, the operator may set a soldering order convenient for an operator's work procedure. Since the controller causes the driving portion to move the soldering iron so that the soldering is sequentially executed in the soldering regions according to the order designated through the input portion, the soldering operation may be executed in the order convenient for the operator's work procedure.

The principle of the aforementioned embodiment is suitably used for various work sites at which solder melting work is performed.

The invention claimed is:

1. A soldering apparatus comprising:
a soldering iron configured to perform soldering on a surface of an electronic board having soldering regions, the soldering regions including a base region and at least one replication region, the base region having at least one soldering position in an arrangement pattern, each replication region including an arrangement pattern that is the same as the arrangement pattern of the at least one soldering position in the base region;
a driving portion configured to move the soldering iron;
an input portion configured to receive, for each replication region, input of positional relationship data representing a positional relationship between the base region and the replication region, and configured to receive base pattern data representing the arrangement pattern of the at least one soldering position in the base region; and
a controller configured to control the driving portion based on the base pattern data and the positional relationship data,
wherein the controller
(i) determines a base region movement pattern based on the base pattern data,
(ii) controls the driving portion such that the soldering iron moves, according to the determined base region movement pattern, to the at least one soldering position of the base region, and
(iii) controls the driving portion such that the soldering iron is moved in each replication region based on the respective positional relationship data and the determined base region movement pattern.

2. The soldering apparatus according to claim 1,
wherein the controller includes
(i) a pattern determination portion configured to determine the base region movement pattern based on the base pattern data, and
(ii) a signal generator configured to generate a base driving signal and transmit the base driving signal to the driving portion, and configured to generate a replication driving signal and transmit the replication driving signal to the driving portion, and
wherein the driving portion moves the soldering iron in response to the base driving signal such that the soldering iron moves in the base region according to the determined base region movement pattern, and the driving portion moves the soldering iron in response to the replication driving signal such that the soldering iron moves to the at least one replication region based on the positional relationship data and the determined base region movement pattern and then moves inside the at least one replication region according to the determined base region movement pattern.

3. The soldering apparatus according to claim 2,
wherein the positional relationship data includes region number data, which represents a numerical quantity of regions in a group of soldering regions including the base region and the at least one replication region aligned along a predetermined axis extending from the base region, and includes offset data, which represents spacing of two adjacent regions among the group of soldering regions, and
wherein the signal generator refers to the region number data and the offset data to generate the base driving signal and the replication driving signal so that the soldering iron moves in each of the regions in the group according to the determined base region movement pattern.

4. The soldering apparatus according to claim 2,
wherein the at least one replication region corresponds to a plurality replication regions,
wherein the positional relationship data includes second region number data, which represents a numerical quantity of regions in a second group of soldering regions including the base region and at least one of the replication regions aligned along a second axis orthogonal to a first axis, the second axis extending from the base region, and the positional relationship data includes second offset data, which represents spacing of two adjacent regions among the second group of soldering regions, and
wherein the signal generator refers to the second region number data and the second offset data to generate the replication driving signal so that the soldering iron moves in each replication region in the second group according to the determined base region movement pattern.

5. The soldering apparatus according to claim 2,
wherein the input portion receives input of vertical movement amount data, which represents a movement amount of the soldering iron when the soldering iron moves upward from the surface of the electronic board after soldering at each soldering position of the base region,
wherein the pattern determination portion refers to the vertical movement amount data to determine the base region movement pattern such that, according to the base region movement pattern, the soldering iron moves upward after soldering at each soldering position of the base region, and wherein the replication driving signal generated by the signal generator operates the driving portion so that the soldering iron moves in the at least one replication region according to the determined base region movement pattern, which movement includes upward movement of the soldering iron after soldering at each soldering position of the base region.

6. The soldering apparatus according to claim 5, wherein the at least one soldering position includes a first soldering position and a second soldering position different from the first soldering position, the base pattern data includes a coordinate value for the first soldering position and a coordinate value for the second soldering position, and the input portion receives the vertical movement data as coordinate values specifying an amount of upward movement of the soldering iron for the first soldering position and an amount of upward movement of the soldering iron for the second soldering position that differs from the amount of upward movement for the first soldering position.

7. The soldering apparatus according to claim 5, wherein the at least one soldering position includes a first soldering position and a second soldering position different from the first soldering position, the base pattern data includes a coordinate value for the first soldering position and a coordinate value for the second soldering position, and the input portion receives the vertical movement data as a single common value that specifies an amount of upward movement of the soldering iron collectively for the first soldering position and the second soldering position, such that the amount of upward movement is the same for both the first soldering position and the second soldering position.

8. The soldering apparatus according to claim 1, wherein the input portion receives designation of a sequential order of soldering to the soldering regions, and wherein the driving portion moves the soldering iron under control of the controller so that the soldering iron performs soldering in the soldering regions according to the designated sequential order.

\* \* \* \* \*